US 7,424,546 B1

(12) United States Patent
Aweya et al.

(10) Patent No.: US 7,424,546 B1
(45) Date of Patent: Sep. 9, 2008

(54) RATE-BASED PROPORTIONAL-INTEGRAL CONTROL SCHEME FOR ACTIVE QUEUE MANAGEMENT

(75) Inventors: James Aweya, Kanata (CA); Michel Ouellette, Plantagenet (CA); Delfin Montuno, Kanata (CA); Kent Felske, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1395 days.

(21) Appl. No.: 10/426,286

(22) Filed: Apr. 30, 2003

(51) Int. Cl.
*G06F 15/16* (2006.01)
*G06F 15/173* (2006.01)
*G06F 11/00* (2006.01)

(52) U.S. Cl. .................. 709/232; 709/223; 709/235; 370/229; 370/235

(58) Field of Classification Search .......... 709/223, 709/229, 232, 235, 240; 370/229, 235
See application file for complete search history.

(56) References Cited

U.S. PATENT DOCUMENTS

| | | | | |
|---|---|---|---|---|
| 6,128,348 A * | 10/2000 | Kao et al. | .............. | 375/260 |
| 6,480,899 B1 * | 11/2002 | Seddigh et al. | .............. | 709/240 |
| 6,788,697 B1 * | 9/2004 | Aweya et al. | .............. | 370/412 |
| 6,842,424 B1 * | 1/2005 | Key et al. | .............. | 370/236 |
| 6,917,585 B1 * | 7/2005 | Firoiu et al. | .............. | 370/229 |
| 6,977,943 B2 * | 12/2005 | Zboril | .............. | 370/429 |
| 7,002,980 B1 * | 2/2006 | Brewer et al. | .............. | 370/414 |
| 7,020,086 B2 * | 3/2006 | Juttner et al. | .............. | 370/238 |
| 7,085,236 B2 * | 8/2006 | Oldak et al. | .............. | 370/235.1 |

OTHER PUBLICATIONS

Aweya, J. et al., "A Control Theoretic Approach to Active Queue Management," *Computer Networks*, vol. 36, Issue 2-3, Jul. 2001, pp. 203-235.
Braden, D. et al., "Recommendation on Queue Management and Congestion Avoidance in the Internet," *IETF RFC* 2309, Apr. 1998.
Chait, Y et al., "Fixed and Adaptive Model-Based Controllers for Active Queue Management," *Proc. American Control Conf.*, Arlington, VA, Jun. 25-27, 2001, pp. 2981-2986.
Cnodder, S.D. et al. "A Rate Based Red Mechanism," *Proc. NOSSDAV* 2000, Chapel Hill, North Carolina, Jun. 26-28, 2000, pp. 602-609.
Feng, W. et al., "A Self-Configuring RED," *Proc. IEEE INFOCOM'99*, 1999, pp. 1320-1328.
Feng, W. et al., "BLUE: A New Class of Active Queue Management Algorithms", *Technical Report* CSE-TR-387-99, Dept. of EECS, University of Michigan, Apr. 1999.

(Continued)

*Primary Examiner*—Ario Etienne
(74) *Attorney, Agent, or Firm*—Ridout & Maybee LLP

(57) ABSTRACT

Disclosed is an Active Queue Management method and apparatus which uses traffic rate information for congestion control. Using a nonlinear fluid-flow model of Traffic Control Protocol, a proportional-integral controller in a closed loop configuration with gain settings characterized for stable operation allows a matching of the aggregate rate of the active TCP connections to the available capacity. Further disclosed is a method for calculation of the regime of gain settings for which stable operation of a given network obtains. This approach allows for capacity matching while maintaining minimal queue size and high link utilization.

14 Claims, 14 Drawing Sheets

OTHER PUBLICATIONS

Floyd, S. et al., "Random Early Detection Gateway for Congestion Avoidance," *IEEE/ACM Trans. Networking*, vol. 1, No. 4, Aug. 1993, pp. 397-413.

Hollot, C.V. et al., "A Control Theoretic Analysis of RED," *Proc. IEEE INFOCOM* 2001, pp. 1510-1519.

Hollot, C.V. et al., "On Designing Improved Controllers for AQM Routers Supporting TCP Flows," *Proc. IEEE INFOCOM* 2001, pp. 1726-1734.

Kharitonov, V.L. et al., "Robust Stability of Time-delay Systems," *IEEE Trans. Automatic Control*, vol. 39, No. 12, Dec. 1994, pp. 2388-2397.

Kunniyur, S. et al., "End-to-end Congestion Control: Utility Functions, Random Losses and ECN Marks," *Proc. IEEE INFOCOM'2000*, Tel Aviv, Israel, Mar. 2000, pp. 1323-1332.

Misra, V. et al."Fluid-based Analysis of a Network of AQM Routers Supporting TCP Flows with an Application to RED," *Proc. ACM SIGCOMM* 2000, pp. 151-160.

Morris, R. et al., "Scalable TCP Congestion Control," *Proc. IEEE INFOCOM* 2000, pp. 1176-1183.

Ott, T.J. et al., "SRED: Stabilized RED", *Proc. IEEE INFOCOM'99*, NY, Mar. 21-25, 1999, pp. 1346-1355.

Silva, G.J. et al., "New Results on the Synthesis of PID Controllers," *IEEE Trans. Automatic Control*, vol. 47, No. 2, Feb. 2002, pp. 241-252.

Silva, G.J. et al., "Stabilization of Time Delay Systems," *Proc. American Control Conf.*, Chicago, Illinois, Jun. 2000, pp. 963-970.

Su, L. et al., "An Active Queue Management Scheme for Internet Congestion Control and its Application to Differentiated Services," *Proc. ICCCN* 2000, Las Vegas, Nevada, Oct. 2000, pp. 62-68.

Villamizar, C. et al., "High Performance TCP in ANSNET," *ACM Computer Commun. Rev.*, vol 24, No. 5, Oct. 1995.

\* cited by examiner

RATE-BASED PROPORTIONAL-INTEGRAL CONTROL SCHEME FOR ACTIVE QUEUE MANAGEMENT

FIELD OF THE INVENTION

The present invention relates generally to network queue management, and more particularly to a technique for active queue management using proportional-integral control and rate-based information.

BACKGROUND OF THE INVENTION

Congestion control in the Internet has primarily been the responsibility of the end-to-end congestion control mechanisms of TCP (Transmission Control Protocol). However, with the rapid growth of the Internet and the strong requirements for quality of service (QoS) support, it has become clear that the Internet could not exclusively rely on the end hosts to perform the end-to-end congestion control. Mechanisms are needed in the intermediate network elements to complement the end hosts congestion control mechanisms. Recognizing this, the Internet Engineering Tasks Force (IETF) has advocated the deployment of active queue management (AQM) mechanisms at the intermediate network elements (routers, switches, etc.) as a means of congestion control.

To perform AQM, the network elements are equipped with the means to detect incipient congestion and to signal the traffic sources before congestion actually occurs. AQM mechanisms allow the network elements to send explicit/implicit feedback of congestion to the end hosts by marking/dropping packets. The end hosts in turn react to the packet marking/dropping by reducing their data transmission rates. The main goals of AQM are to reduce the average queue lengths in the network elements and thereby decrease the end-to-end delay experienced by end user traffic, and maximize the utilization of network resources by reducing the packet loss that occurs when queues overflow.

The traditional queue management mechanism is "drop tail" which is simple to implement and is widely deployed. With drop tail mechanism, packets are dropped only at buffer overflow at which point congestion signals are conveyed to the end hosts. This results in a significantly long time period between the instant when congestion occurs and the instant when the end hosts reduce their data transmission rates. During this time period, more packets may be sent by the end hosts which could be eventually dropped. Drop tail can lead to problematic global synchronization of the traffic sources (where the sources ramp their traffic rates and backoff at the same time) and periods of low link utilization.

A number of AQM schemes have been proposed which use either queue size information for congestion control (so-called queue-based schemes) or traffic rate information (so-called rate-based schemes). Queue-based AQM schemes adapt their marking/dropping probabilities in a manner that depends on the queue size at the link. With small buffers they tend to perform poorly. For example, studies have shown that a technique such as RED (Random Early Detection) described by S. Floyd and V. Jacobson in "Random Early Detection Gateway for Congestion Avoidance," IEEE/ACM Trans. *Networking*, Vol. 1, No. 4, August 1993, pp. 397-413 performs well only when the queuing capacity is greater than the bandwidth-delay product. Quite naturally the dependence of a queue-based scheme on queue size information for control will require that there be sufficient buffering for effective process tracking and control. Very small buffers tend to complicate the control problem in this case.

A number of recent studies such as C. V. Hollot, V. Misra, D. Townsley, and W. B. Gong, "A Control Theoretic Analysis of RED," *Proc. IEEE INFOCOM* 2001, 2001, pp. 1510-1519, C. V. Hollot, V. Misra, D. Townsley, and W. B. Gong, "On Designing Improved Controllers for AQM Routers Supporting TCP Flows," *Proc. IEEE INFOCOM* 2001, 2001, pp. 1726-1734, Y. Chait, C. V. Hollot, and V. Misra, "Fixed and Adaptive Model-Based Controllers for Active Queue Management," *Proc. American Control Conf.*, Arlington, Va., Jun. 25-27, 2001, pp. 2981-2986, and V. Misra, W. B. Gong, and D. Townsley, "Fluid-based Analysis of a Network of AQM Routers Supporting TCP Flows with an Application to RED," *Proc. ACM SIGCOMM* 2000, 2000, pp. 151-160, have described queue-based AQM schemes which explicitly rely on dynamic modeling and feedback control principles. Central to these studies is the recognition that AQM schemes are essentially feedback control systems and that the principles of control theory can provide critical insight and guidance into the analysis and design of such schemes. The fluid flow analytical model of TCP described in "Fluid-based Analysis of a Network of AQM Routers Supporting TCP Flows with an Application to RED" by Misra et al. particularity expresses TCP dynamics in a form that allows control theoretic approaches to be applied for AQM design and analysis.

In view of the foregoing, it would be desirable to provide a technique for network queue management which overcomes the above-described inadequacies and shortcomings.

SUMMARY OF THE INVENTION

An object of the present invention is to provide an improved rate-based proportional-integral control scheme for active queue management.

According to an aspect of the invention there is provided a method for controlling a data flow in a data network, starting with selecting a stable gain combination of a proportional controller gain $k_p$ and an integral controller gain $k_i$. Next measuring a data arrival rate R(n) (in bits or bytes per second) at time n. Next, calculating an error signal e(n), according to the relation $$e(n)=(T(n)-R(n))/x,$$

where T(n) (in bits or bytes per second) is an assigned capacity at time n and x (x=1) is a parameter (in bits or bytes per second) representing a nominal packet size used in the computation of $k_p$ and $k_i$. Next, a mark/drop probability p(n) is computed according to the relation $$p_p(n)=\min\{\max[k_p \cdot e(n),0],p_{max}\}$$

$$p_i(n)=\min\{\max[p_i(n-1)+k_i \cdot \Delta t \cdot e(n),0],p_{max}\}$$

$$p(n)=\min\{\max[p_p(n)+p_i(n),0],p_{max}\}$$

where $\Delta t$ is the time interval between a $(n-1)^{th}$ and the $n^{th}$ computation, and $0<p_{max}\leq 1$. Finally a packet mark/drop routine is executed based upon the calculated mark/drop probability p(n).

Conveniently, the data arrival rate may be filtered by use of an exponentially weighted moving average scheme according to the relation $$R'(n)=(1-\beta)\cdot R'(n-1)+\beta \cdot R(n)$$

where $\beta$ is a filter gain parameter such that $0<\beta<1$, R'(n−1) is the filtered data arrival rate at time n−1, and R'(n) is the desired filtered data arrival rate at time n.

According to another aspect of the invention, preceding the packet/mark drop routine may be a bypassing routine involving the steps of testing the data arrival rate R(n) against a rate threshold $T_L$; and if the data arrival rate R(n) is below or equal to the rate threshold $T_L$ then bypassing the step of executing a packet mark/drop routine.

Conveniently, the packet mark/drop routine may be realized according to a random number generator mark/drop scheme.

Also conveniently, the stable gain combination may be chosen from a pre-calculated regime of stable gain pairs. A method for pre-calculating the regime may be as follows: starting with (1) obtaining for said network a value for said network a set of parameters k, $d_0$, and $\tau$, where k is a steady-state gain of said network, $d_0$ is a time delay of said network, and $\tau$ is a time constant of said network. Next step (2) of choosing a $k_p$ in the range $$-\frac{1}{k}\left[\frac{\tau}{d_0}\alpha_1\sin(\alpha_1) - \cos(\alpha_1)\right] < k_p < \frac{1}{k}$$

where $\alpha_1$ is a solution of $$\tan(\alpha) = -\frac{\tau}{\tau + d_0}\alpha$$

in the interval $(0,\pi)$ Then step (3) initializing a counter j for tracking odd number roots to an initial value of 1. Next, step (4) of determining the root $z_j$ of $$-kk_p\cos(z_j) - \frac{\tau}{d_0}z_j\sin(z_j) = 0,$$

followed by step (5) computing the parameter $a_j$ associated with $z_j$ using $$a_j = -\frac{z_j}{kd_0}\left[\sin(z_j) + \frac{\tau}{d_0}z_j\cos(z_j)\right].$$

Next the root $z_j$ is tested to see if a maximal bound has been reached by determining if $\cos(z_j) > 0$. If it is not, then the root counter j is incremented by two to point to the next odd-number root and the routine returns to step (4). If $\cos(z_j) > 0$ then choosing the maximum of all calculated $a_j$'s as the lower bound of $k_i$ for the $k_p$ specified in step (2), and then repeating steps (2) through (7) for all desired values of $k_p$.

In accordance with another other aspect of the present invention, there is provided an apparatus for controlling a data flow in a data network, the apparatus being configured according to the methods described above.

In accordance with another other aspect of the present invention, there is provided an article of manufacture carrying instructions for a method for controlling a data flow in a data network, and further there is provided a signal embodied in a carrier wave representing instructions for a method for controlling a data flow in a data network according to a proportional-integral control scheme.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments, which are within the scope of the present invention as disclosed and claimed herein.

BRIEF DESCRIPTION OF THE DRAWINGS

The invention will be further understood from the following detailed description of embodiments of the invention and accompanying drawings, in which.

DETAILED DESCRIPTION

Figure 1:
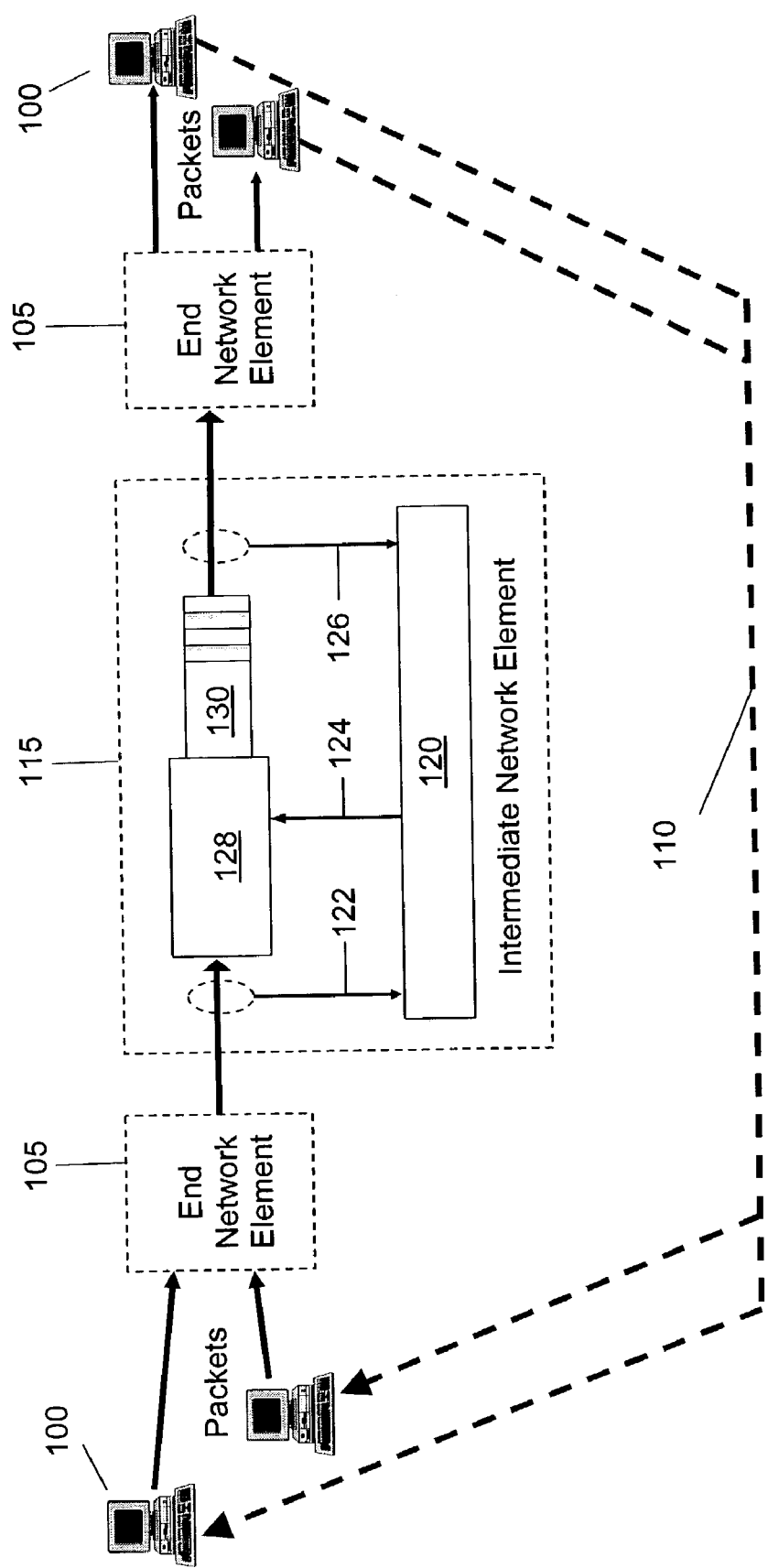
FIG. 1 is a diagram of an active queue management proportional-integral controller in an Intermediate Network Element according to an embodiment of the invention.

A high level depiction of an implementation of the active queue management proportional-integral control scheme according to a possible embodiment is given in FIG. 1.

Users 100 communicate with End Network Elements 105 which pass packet data either directly or through Intermediate Network Elements 115, to other End Network Elements 105. End-to-end congestion control mechanisms under normal TCP (Transmission Control Protocol) rely upon Implicit/Explicit Feedback Signals 110. Examples of Implicit/Explicit Feedback Signals 110 typically include duplicate TCP acknowledgement packets, timeouts, and marked packets.

In order to meet the stringent requirements for Quality of Service (QoS) of users, and the increases in data volume with the rapid growth of the Internet, it is advantageous to provide congestion control mechanisms at intermediate points to complement the end hosts congestion control mechanisms. According to one aspect of the invention, Intermediate Network Element 115 has been equipped with such a mechanism for congestion control.

Within Intermediate Network Element 115 are a Proportional-Integral Controller 120, a queue means 130, an arrival rate measurement means 122, a target rate measurement means 126, a packet mark/drop module 128, and a mark/drop probability control means 124 by which the Proportional-Integral Controller 120 influences the packet mark/drop module 128 according to a scheme described hereafter.

Figure 2:
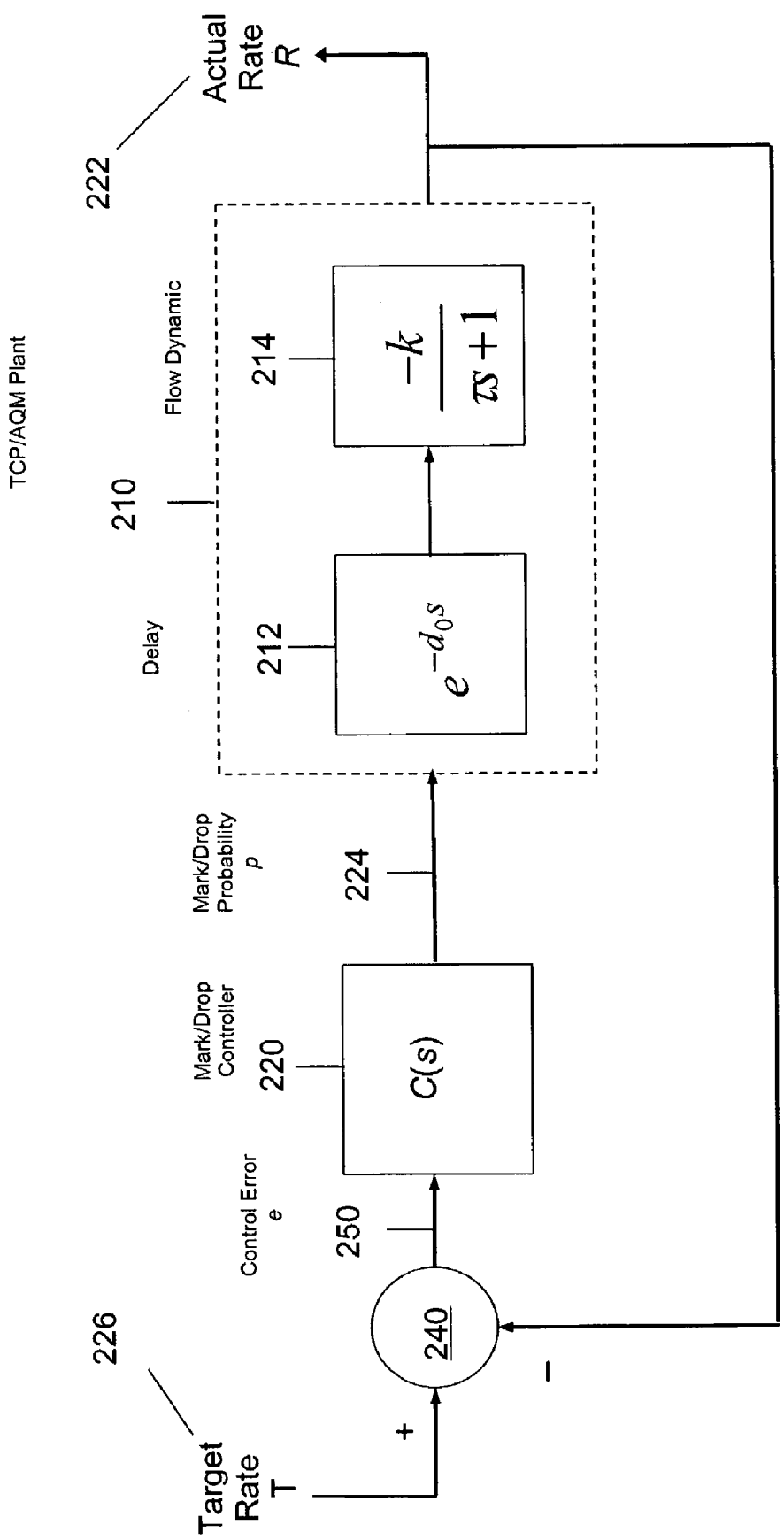
FIG. 2 is a diagram of a closed loop control system according to an embodiment of the invention.

A control system oriented depiction of the system of FIG. 1 may be seen in FIG. 2 where the closed-loop system is represented as having two main elements; TCP/AQM plant 210 and the control-function means 220. The control system functions by comparing a desired Target-Rate "T" 226 with an Actual-Rate "R" 222 via a summer 240 which generates a control error "e" 250 by determining the difference between the two rates. This difference is used as an input to the control-function means 220 which generates a mark/drop probability threshold "p" 224. Changes in the threshold for marking or dropping packets results in an eventual change in the Actual-Rate "R" 222 as the effects propagate through the system. As with all closed loop systems, the control-function means 220 must have a control function response chosen so as to render a stable closed-loop system response. If this condition is not met the resultant performance will be deleterious to the network operation, possibly to the point of causing network performance degradation.

In order to be able to determine the stability requirements for the control-function means, the open loop transfer function for TCP/AQM plant 210 must be established. This may be done as follows.

A simplified rate-based fluid-flow model of a TCP source i assessing a single link is described by the following nonlinear differential equation:

$$\dot{r}_i(t) = \frac{1}{d_i^2(t)} - \theta r_i(t) r_i(t-d_i(t)) p(t-d_i(t)) \tag{1}$$

where $\dot{r}$ denotes the time-derivative of r, $r_i$ is rate of the TCP source (in packets per second), $d_i$ is the round-trip time (RTT) of the TCP source (in seconds), p is the marking/dropping probability of a TCP packet at the link, and $\theta$ is a parameter characteristic of the type of TCP source. This model of TCP ignores the slow-start and the timeout behavior of TCP. Note that $r_i$ and p are bounded, respectively, as follows; $r_i \in [0,C]$, $p \in [0,1]$, where C is the link capacity.

Denoting $p_0$ as the steady-state (or operating point) of the marking/dropping probability of a TCP source and assuming a constant RTT $d_0$, the steady-state throughput $r_0$ can be obtained as $$0 = \frac{1}{d_0^2} - \theta r_0^2 p_0 \text{ or}$$

$$r_0 = \frac{1}{d_0} \sqrt{\frac{1}{\theta p_0}}.$$

If the parameter $\theta$ takes on the value of ⅔, we get the steady-state throughput of TCP as $$r_0 = \frac{1}{d_0} \sqrt{\frac{3}{2 p_0}}.$$

Making the approximation relating data transmission rate and window size $$r_i(t) \approx \frac{W_i(t)}{d_i(t)},$$

and assuming $d_i(t) = d_i =$ constant, we get $$\dot{r}_i(t) \approx \frac{d}{dt}\left(\frac{W_i(t)}{d_i(t)}\right) = \frac{1}{d_i} \frac{dW_i(t)}{dt} - \frac{W_i(t)}{d_i^2} \frac{dd_i}{dt} \approx \frac{1}{d_i} \frac{dW_i(t)}{dt}.$$

With this, we see that making the approximation $r_i(t) \approx W_i(t)/d_i(t)$ shows that the rate-based fluid-flow model of a TCP source is essentially equivalent to a window based nonlinear fluid-flow TCP model.

Assuming a constant RTT $d_0$, we rewrite the initial equation as $$f(r_i, r_{i,d}, p) = \dot{r}_i(t) = \frac{1}{d_0^2} - \theta r_i(t) r_{i,d}(t) p(t - d_0) \tag{2}$$

where $$r_{i,d}(t) \doteq r_i(t - d_0).$$

Using Taylor series expansion, the small-signal linearization of $$f(r_i, r_{i,d}, p) = \dot{r}_i(t)$$

about an operating point $(r_0, p_0)$ is given as $$\delta \dot{r}_i(t) = \frac{\partial f}{\partial r_i}\bigg|_{r_0, p_0} \delta r_i(t) + \frac{\partial f}{\partial r_{i,d}}\bigg|_{r_0, p_0} \delta r_{i,d}(t) + \frac{\partial f}{\partial p}\bigg|_{r_0, p_0} \delta p(t - d_0) \tag{3}$$

where $$\delta r_i(t) = r_i(t) - r_0$$

$$\delta r_{i,d}(t) = r_{i,d}(t) - r_0$$

$\delta p(t-d_0) = p(t-d_0) - p_0$ and $$\left.\frac{\partial f}{\partial r_i}\right|_{r_0,p_0} = \left.\frac{\partial f}{\partial r_{i,d}}\right|_{r_0,p_0} = -\theta r_0 p_0 \left.\frac{\partial f}{\partial p}\right|_{r_0,p_0} = -\theta r_0^2$$

The linearized equation (3) then becomes $\delta \dot{r}_i(t) = -\theta r_0 p_0 (\delta r_i(t) + \delta r_{i,d}(t)) - \theta r_0^2 \delta p(t-d_0).$ (4)

Making the approximation $r_i(t) \approx r_{i,d}(t)$ in (4), we get $\delta \dot{r}_i(t) = -2\theta r_0 p_0 \delta r_i(t) - \theta r_0^2 \delta p(t-d_0)$ (5)

Let us assume that the link of capacity C (in packets per second) is shared by a constant number N of TCP sources. The aggregate rate on the link R(t) is given by $$\sum_{i=1}^{N} r_i(t) = R(t). \tag{6}$$

From (6), the equilibrium point of the system can be expressed as $$\sum_{i=1}^{N} r_0 = R_0 = \rho C, \quad \text{or} \tag{7}$$

$$r_0 = \frac{\rho C}{N}, \tag{8}$$

where $\rho \in (0,1]$ is a target utilization factor. From (1) and (8), the equilibrium point of the marking/dropping probability can be expressed as $$p_0 = \frac{1}{d_0^2 \theta r_0^2} = \frac{N^2}{\theta (d_0 \rho C)^2}. \tag{9}$$

Defining $\delta R(t) = R(t) - R_0$, we know from (6) that $$\delta R(t) = \sum_{i=1}^{N} \delta r_i(t) \quad \text{and} \tag{10}$$

$$\begin{aligned}\delta \dot{R}(t) &= \sum_{i=1}^{N} \delta \dot{r}_i(t) \\ &= -2\theta r_0 p_0 \sum_{i=1}^{N} \delta r_i(t) - \sum_{i=1}^{N} \theta r_0^2 \delta p(t-d_0) \\ &= -2\theta r_0 p_0 \delta R(t) - N\theta r_0^2 \delta p(t-d_0)\end{aligned} \tag{11}$$

Substituting the equilibrium points $(r_0, p_0)$ in (11), we get $$\delta \dot{R}(t) = -\frac{2N}{d_0^2 \rho C} \delta R(t) - \frac{\theta \rho^2 C^2}{N} \delta p(t-d_0) \quad \text{or} \tag{12}$$

-continued $$\frac{d_0^2 \rho C}{2N} \delta \dot{R}(t) = -\delta R(t) - \frac{\theta d_0^2 \rho^3 C^3}{2N^2} \delta p(t-d_0) \tag{13}$$

$\tau \delta \dot{R}(t) + \delta R(t) = -k \delta p(t-d_0)$ where $$\tau = \frac{d_0^2 \rho C}{2N} \quad \text{and} \quad k = \frac{\theta d_0^2 \rho^3 C^3}{2N^2}.$$

Taking the Laplace transform of (13) we get $\tau s \mathfrak{R}(s) + \mathfrak{R}(s) = -k e^{-d_0 s} P(s),$ (14)

where $\mathfrak{R}(s)$ is the Laplace transform of $\delta R(t)$ and $e^{-sd_0}P(s)$ is the Laplace transform of $\delta p(t-d_0)$.

We obtain the open-loop transfer function of the TCP/AQM plant from (14) as $$G(s) = \frac{\mathfrak{R}(s)}{P(s)} = \frac{-k e^{-d_0 s}}{\tau s + 1}. \tag{15}$$

In (15), $-k$ represents the steady-state (or static) gain of the TCP/AQM plant, $d_0$ represents the time delay (or dead time), and $r$ represents the time constant of the plant. The step response of the model (15) is $R(t) = -k(1 - e^{-(t-d_0)/\tau}).$ (16)

From (16), it follows that the average residence time is $$T_{av} = \frac{\int_0^\infty (R(\infty) - R(t)) dt}{-k} = \tau e^{d_0/\tau} \approx d_0 + \tau \tag{17}$$

Figure 3:
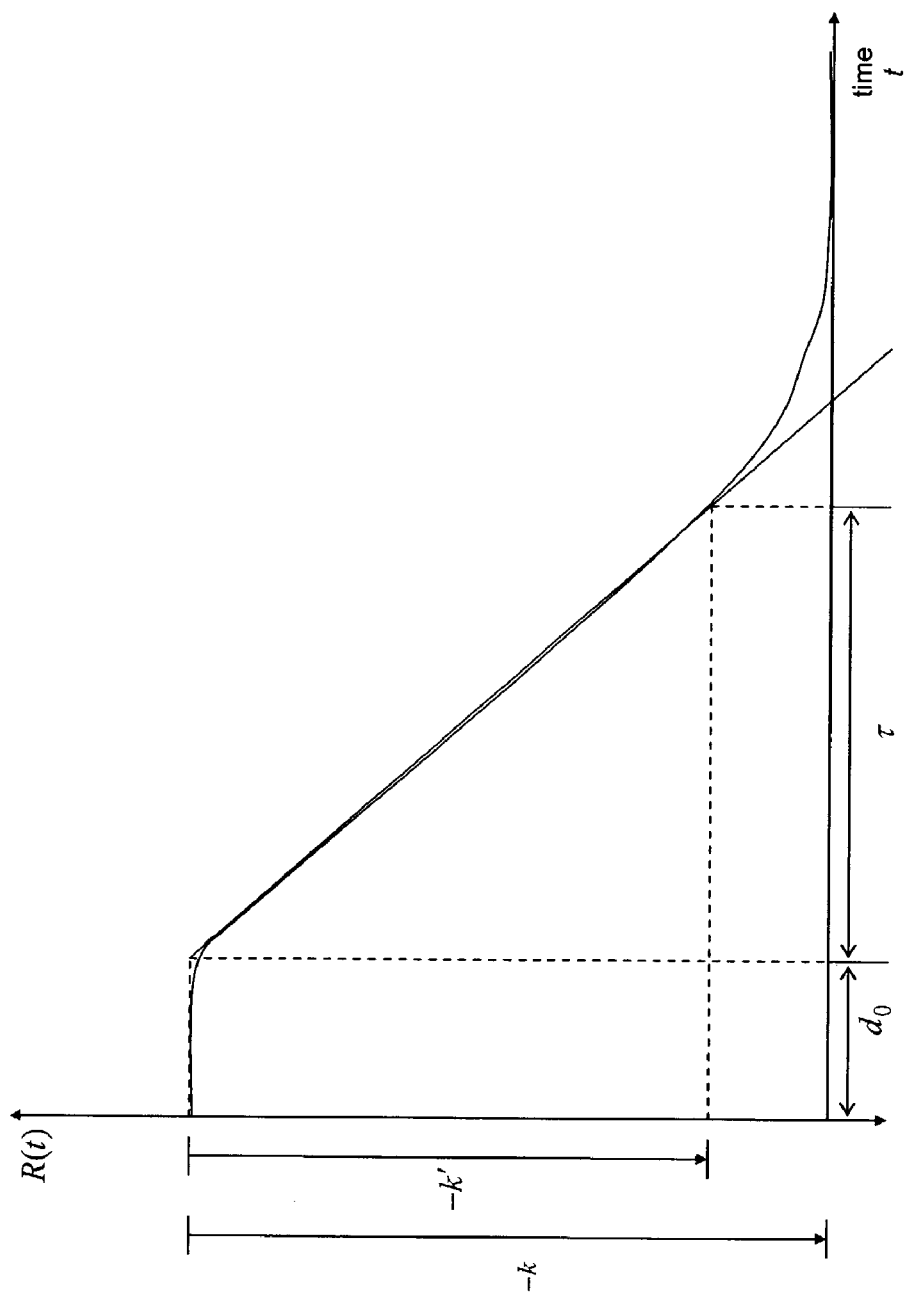
FIG. 3 is a plot of a typical open loop response of the TCP/AQM plant according to an embodiment of the invention.

The ratio $$\eta = \frac{d_0}{d_0 + \tau} = \frac{d_0}{T_{av}} \tag{18}$$

is called the normalized dead time and has the property $0 \leq \eta \leq 1$. This quantity can be used to characterize the difficulty of controlling a process. It is sometimes called the controllability ratio. It has been observed that processes with small $\eta$ are easy to control and that the difficulty in controlling the system increases as $\eta$ increases. The parameters in the model (15) are represented graphically in FIG. 3. The parameter $-k'$ is simply the gain corresponding to the time distance $d_0 + \tau$.

The goal of the control system is to mark/drop packets such that the aggregate rate of the active TCP connections will match the available capacity while at the same time maintain minimal queue size and high link utilization. Having established an expression for the open loop transfer function for TCP/AQM plant 210, it is now possible to consider an expression for the system as a whole.

Returning to FIG. 2 and noting again that Target-Rate "T" 226 is the control target, Actual-Rate "R" 222 is the output of the plant (actual traffic arrival rate), mark/drop probability threshold "p" 224 is the control input, TCP/AQM plant 210 given by (15) is the plant to be controlled, and C(s), the control-function means 220 is to be a Proportional-integral controller.

The Laplace expression for the case of a PI controller may be written as, $$C(s) = k_p + \frac{k_i}{s}, \tag{19}$$

where $k_p$ and $k_i$ are, respectively, the proportional and integral gains of the controller.

The closed-loop transfer function of the TCP/AQM plant is then given as $$G_{AQM}(s) = \frac{C(s)G(s)}{1+C(s)G(s)} = \frac{-(kk_i + kk_p s)e^{-d_0 s}}{\tau s^2 + s - (kk_i + kk_p s)e^{-d_0 s}}. \tag{20}$$

In order to result in a stable system, appropriate choices must be made for the values of the parameter $k_p$ and $k_i$ in the controller for which the closed-loop system is stable. It can be shown that the stability analysis of the closed-loop system shown in FIG. 2 is quite a complicated problem due to the presence of an infinite number of roots of the characteristic equation.

Using an extension of the Hermite-Biehler Theorem applicable to quasipolynomials a detailed analytical characterization of the stabilizing feedback gains of the closed-loop TCP/AQM system may be performed as follows.

The characteristic equation of a control system with time delay can be expressed in the general form as $$F(s) = d(s) + e^{-sT_1} n_1(s) + e^{-sT_2} n_2(s) + \ldots + e^{-sT_m} n_m(s), \tag{21}$$

where $d(s)$, $n_i(s)$ for $i=1, 2, \ldots, m$, are polynomials with real coefficients.

Characteristic equations of the form (21) are also referred to as quasipolynomials. It can be shown that the so-called Hermite-Biehler Theorem for Hurwitz polynomials does not carry over to arbitrary functions $f(s)$ of the complex variable s. However, a suitable extension of the Hermite-Biehler Theorem can be developed to study the stability of certain classes of quasipolynomials characterized as follows.

If the following assumptions are made in (21)
  A1: $\deg[d(s)] = n$ and $\deg[n_i(s)] \leq n$ for $i=1, 2, \ldots, m$;
  A2: $0 < T_1 < T_2 < \ldots < T_m$, then instead of (21), we can consider the quasipolynomial $$F^*(s) = e^{sT_m} F(s) = e^{sT_m} d(s) + e^{s(T_m - T_1)} n_1(s) + e^{s(T_m - T_2)} n_2(s) + \ldots + n_m(s) \tag{22}$$

Since $e^{sT_m}$ does not have any finite roots, the roots of $F(s)$ are identical to those of $F^*(s)$. The quasipolynomial $F^*(s)$, however, has a principal term, i.e., the coefficient of the term containing the highest powers of s and $e^s$ is nonzero. It then follows that this quasipolynomial is either of the delay (i.e., retarded) or of the neutral type. From this, we can say that the stability of the system with characteristic equation (21) is equivalent to the condition that all the roots of $F^*(s)$ be in the open left-half plane. Equivalently, we will say that $F^*(s)$ is Hurwitz or stable. The theorem below gives necessary and sufficient conditions for the stability of $F^*(s)$:

Theorem 1: Let $F^*(s)$ be given by (22), and write $$F^*(j\omega) = F_r(\omega) + jF_i(\omega)$$

where $F_r(\omega)$ and $F_i(\omega)$ represent the real and imaginary parts of $F^*(s)$, respectively. Under assumptions A1 and A2, $F^*(s)$ is stable if and only if
  1) $F_r(\omega)$ and $F_i(\omega)$ have only simple real roots and these interlace
  2) $\dot{F}_i(\omega_0) F_r(\omega_0) - F_i(\omega_0) \dot{F}_r(\omega_0) > 0$, for some $\omega_0$ in $(-\infty, \infty)$;
  where $\dot{F}_r(\omega)$ and $\dot{F}_i(\omega)$ denote the first derivative with respect to $\omega$ of $F_r(\omega)$ and $F_i(\omega)$, respectively.

Using this theorem the set of all PI control gains that stabilize the first-order TCP/AQM plant with time delay described by (15) may be characterized. A key step in applying Theorem 1 to check stability is to ensure that $F_r(\omega)$ and $F_i(\omega)$ have only real roots. Such a property can be ensured by using the following result:

Theorem 2: Let M and L denote the highest powers of s and $e^s$, respectively, in $F^*(s)$. Let $\eta$ be an appropriate constant such that the coefficients of the terms of highest degree in $F_r(\omega)$ and $F_i(\omega)$ do not vanish at $\omega = \eta$. Then for the equations $F_r(\omega) = 0$ or $F_i(\omega) = 0$ to have only real roots, it is necessary and sufficient that in the intervals $$-2l\pi + \eta \leq \omega \leq 2l\pi + \pi + \eta, l=1, 2, 3,$$

$F_r(\omega)$ or $F_i(\omega)$ have exactly $4lL + M$ real roots starting with a sufficiently large l.

It is now possible to determine analytically the region in the $(k_i, k_p)$ parameter space for which the closed-loop TCP/AQM plant is stable.

Consider the system given by (20) without time delay, i.e., $d_0 = 0$. In this case, the closed-loop characteristic equation of the system is given by $$F(s) = \tau s^2 - (kk_p - 1)s - kk_i. \tag{23}$$

For this second-order polynomial, it is possible to determine necessary and sufficient conditions that the controller and the plant parameters have to satisfy to guarantee the stability of the delay-free closed-loop system. Solving the characteristic equation (23) for the roots, the results are:

$$s_{1,2} = \frac{(kk_p - 1) \pm \sqrt{(kk_p - 1)^2 + 4\tau kk_i}}{2\tau}. \tag{24}$$

Given that $\tau > 0$ and $k > 0$ are always true for the TCP/AQM plant, the closed-loop delay-free system is stable for the following condition $$kk_p - 1 < 0, \; kk_i < 0 \tag{25}$$

or $$k_p < \frac{1}{k} = \frac{2N^2}{\theta d_0^2 \rho^3 C^3}, \; k_i < 0, \tag{26}$$

for a target rate of $T = \rho C$.

It is now appropriate to consider the case where the time delay of the plant model is greater than zero, i.e., $d_0 > 0$. The intent is to determine the set of all stabilizing gains for the system. The closed-loop characteristic equation of the system is then $$F(s) = -(kk_i + kk_p s)e^{-d_0 s} + (1 + \tau s)s. \tag{27}$$

In order to study the stability of the closed-loop system, it is necessary to determine if all the roots of (27) lie in the open left half plane. The presence of the exponential term $e^{-d_0 s}$ results in the number of roots of $F(s)$ being infinite and this makes the stability check very difficult. Fortunately, Theorem 1 can be invoked to determine the set of all stabilizing gains $k_p$ and $k_i$. This procedure is explained as follows.

Consider first the quasipolynomial $F^*(s)$ defined by $$F^*(s) = e^{d_0 s} F(s) = -kk_i - kk_p s + (1 + \tau s) s e^{d_0 s}. \quad (28)$$

Substituting $s = j\omega$, and using the relationship $e^{d_0 j\omega} = \cos(d_0 \omega) + j \sin(d_0 \omega)$, we have the following expression $$F_r^*(j\omega) = F_r(\omega) + j F_i(\omega)$$

where $$F_r(\omega) = -kk_i - \omega \sin(d_0 \omega) - \tau \omega^2 \cos(d_0 \omega)$$

$$F_i(\omega) = \omega[-kk_p + \cos(d_0 \omega) - \tau \omega \sin(d_0 \omega)]$$

It can be seen from the above expressions that the controller parameters $k_i$ and $k_p$ only affect, respectively, the real part and imaginary part of $F^*(j\omega)$. Thus, $k_i$, $k_p$ appear affinely in $F_r(\omega)$, $F_i(\omega)$, respectively. Therefore, by sweeping through all real $k_p$ and solving a stabilization problem at each stage, the set of all stabilizing $(k_p, k_i)$ can be determined for the given plant.

It is necessary to define the range of $k_p$ values over which the sweeping needs to carried out for the TCP/AQM system. For convenience of analysis, make the following change of variables, $z = d_0 \omega$. Then, the real and imaginary parts of $F^*(j\omega)$ may be rewritten as $$F_r(z) = -k[k_i + a(z)] \quad (29)$$

$$F_i(z) = \frac{z}{d_0}\left[-kk_p + \cos(z) - \frac{\tau}{d_0} z \sin(z)\right], \quad (30)$$

where $$a(z) \doteq \frac{z}{k d_0}\left[\sin(z) + \frac{\tau}{d_0} z \cos(z)\right]. \quad (31)$$

Theorem 1 requires that two conditions be checked to ensure the stability of the quasipolynomial $F^*(s)$.

First a check if $$E(\omega_0) = \dot{F}_i(\omega_0) F_r(\omega_0) - F_i(\omega_0) \dot{F}_r(\omega_0) > 0$$

for some $\omega_0$ in $(-\infty, \infty)$.

Taking $\omega_0 = z_0 = 0$, for instance, gives $F_r(z_0) = -kk_i$ and $F_i(z_0) = 0$.

Also obtained is $$\dot{F}_r(z_0) = 0$$

and $$\dot{F}_i(z) = \frac{-kk_p}{d_0} + \left(\frac{d_0 - \tau z^2}{d_0^2}\right)\cos(z) - \left(\frac{2\tau + D_0}{d_0^2}\right) z \sin(z),$$

$$\Rightarrow \dot{F}_i(z_0) = \frac{-kk_p + 1}{d_0}.$$

From these $$E(z_0) = \left(\frac{-kk_p + 1}{d_0}\right)(-kk_i).$$

Given that for the TCP/AQM plant the conditions $\tau > 0$ and $k > 0$ hold true, it will require $F_r(z_0) = -kk_i > 0$ (i.e., $k_i < 0$) and $$\dot{F}_i(z_0) = \left(\frac{-kk_p + 1}{d_0}\right) > 0 \left(\text{i.e., } k_p < \frac{1}{k}\right),$$

for $E(z_0) > 0$. These results are consistent with those given in (25) and (26).

The second check is a check of the interlacing of the roots of $F_r(z)$ and $F_i(z)$. The roots of the imaginary part, i.e., $F_i(z) = 0$ can be determined from (30).

This gives us $$F_i(z) = \frac{z}{d_0}\left[-kk_p + \cos(z) - \frac{\tau}{d_0} z \sin(z)\right] = 0.$$

It can be seen from this equation that $z = 0$ is a root of $F_i(z)$, or $$-kk_p + \cos(z) - \frac{\tau}{d_0} z \sin(z) = 0 \quad (32)$$

One root of the imaginary part $F_i(z)$ is $z_0 = 0$ but the other roots are difficult to find and require an analytical solution of (32). However, a plot of the two terms in (32), $$\left(\text{i.e., } \frac{-kk_p + \cos(z)}{\sin(z)} \text{ and } \frac{\tau}{d_0} z\right)$$

can be used to understand the nature of the real solution.

Consider a plot of these two terms for arbitrarily selected values of $k$, $\tau$ and $d_0$ (the general nature of the plots, however, do not change with the use of other values). Four different cases of the solution are examined:

$$k_p > \frac{1}{k}, -\frac{1}{k} < k_p < \frac{1}{k},$$

In each case, denote the positive real roots of (32) by $z_j$, $j=1, 2, 3, \ldots$, arranged in increasing order of magnitude.

Case 1:

$$k_p > \frac{1}{k}.$$

Figure 4:
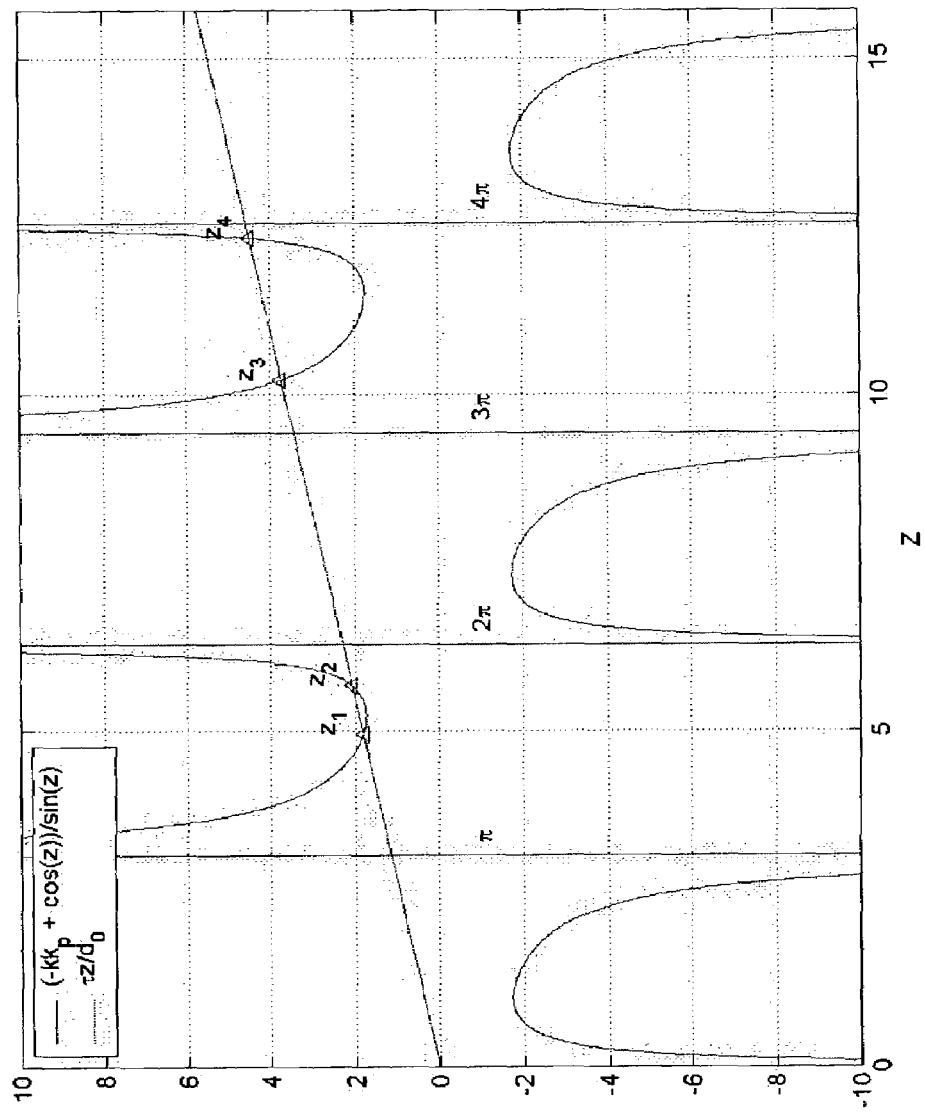
FIG. 4 is a plot of the two terms in Equation (32) for $$k_p > \frac{1}{k}$$

For this case, plot the two terms in (32)

$$\frac{-kk_p + \cos(z)}{\sin(z)} \text{ and } \frac{\tau}{d_0}z$$

as shown in FIG. 4.
Case 2:

$$-\frac{1}{k} < k_p < \frac{1}{k}.$$

Figure 5:
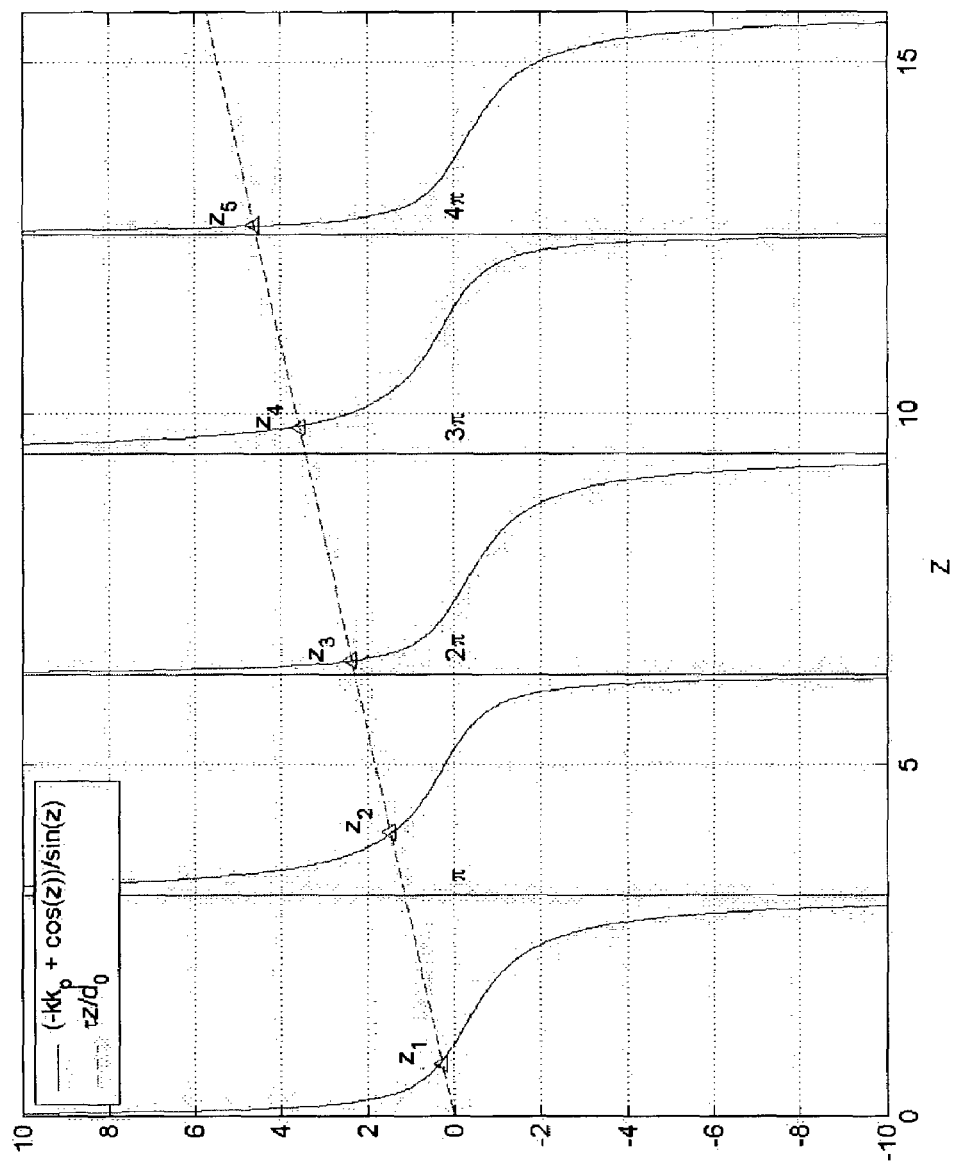
FIG. 5 is a plot of the two terms in Equation (32) for $$-\frac{1}{k} < k_p < \frac{1}{k}$$

For this case, plot the two terms in (32)

$$\frac{-kk_p + \cos(z)}{\sin(z)} \text{ and } \frac{\tau}{d_0}z$$

as shown in FIG. 5.
Case 3:

$$k_p = -\frac{1}{k}.$$

Figure 6:
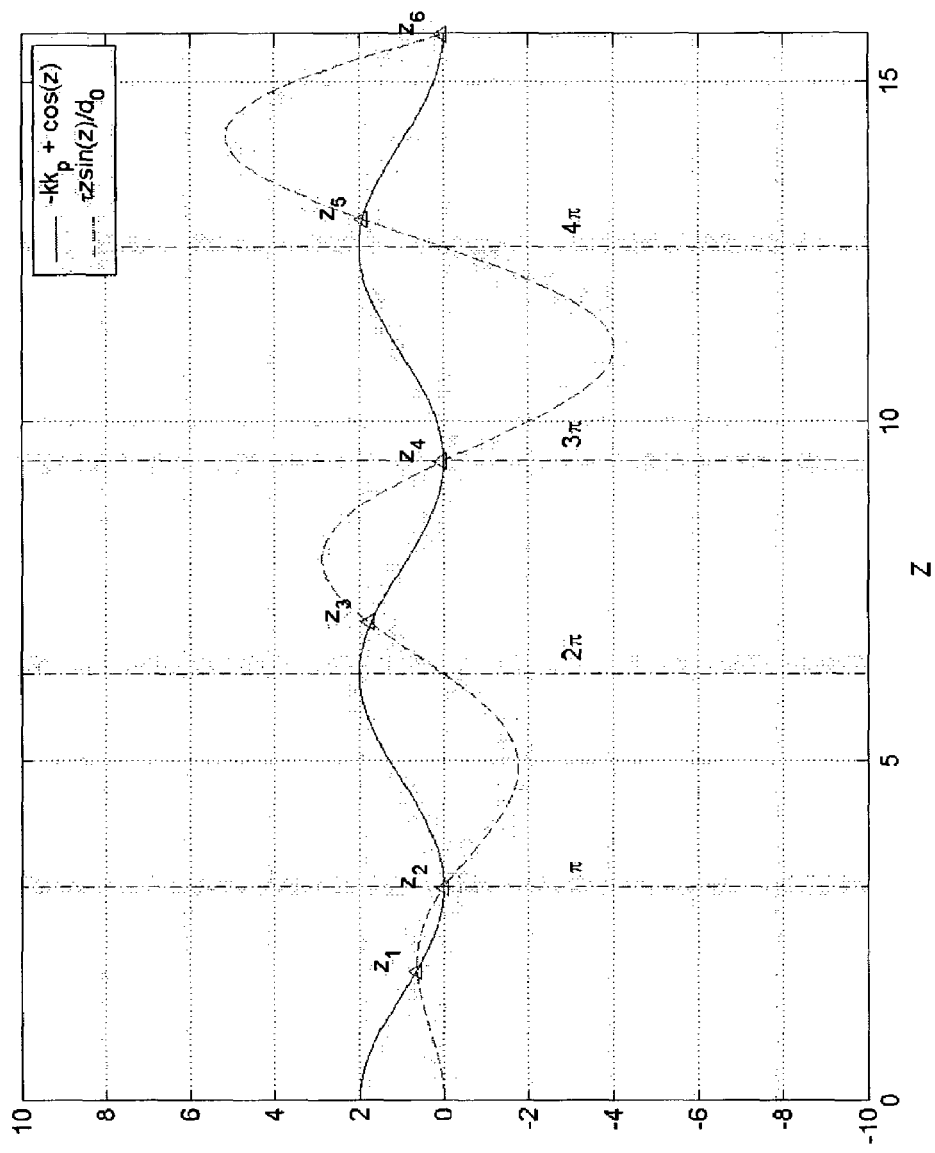
FIG. 6 is a plot of the two terms in Equation (32) for $$k_p = -\frac{1}{k}$$

For this case, plot the two terms in (32) 1+cos(z) and $$\frac{\tau}{d_0}z\sin(z)$$

to obtain FIG. 6.
Case 4:

$$k_p < -\frac{1}{k}.$$

Figure 7:
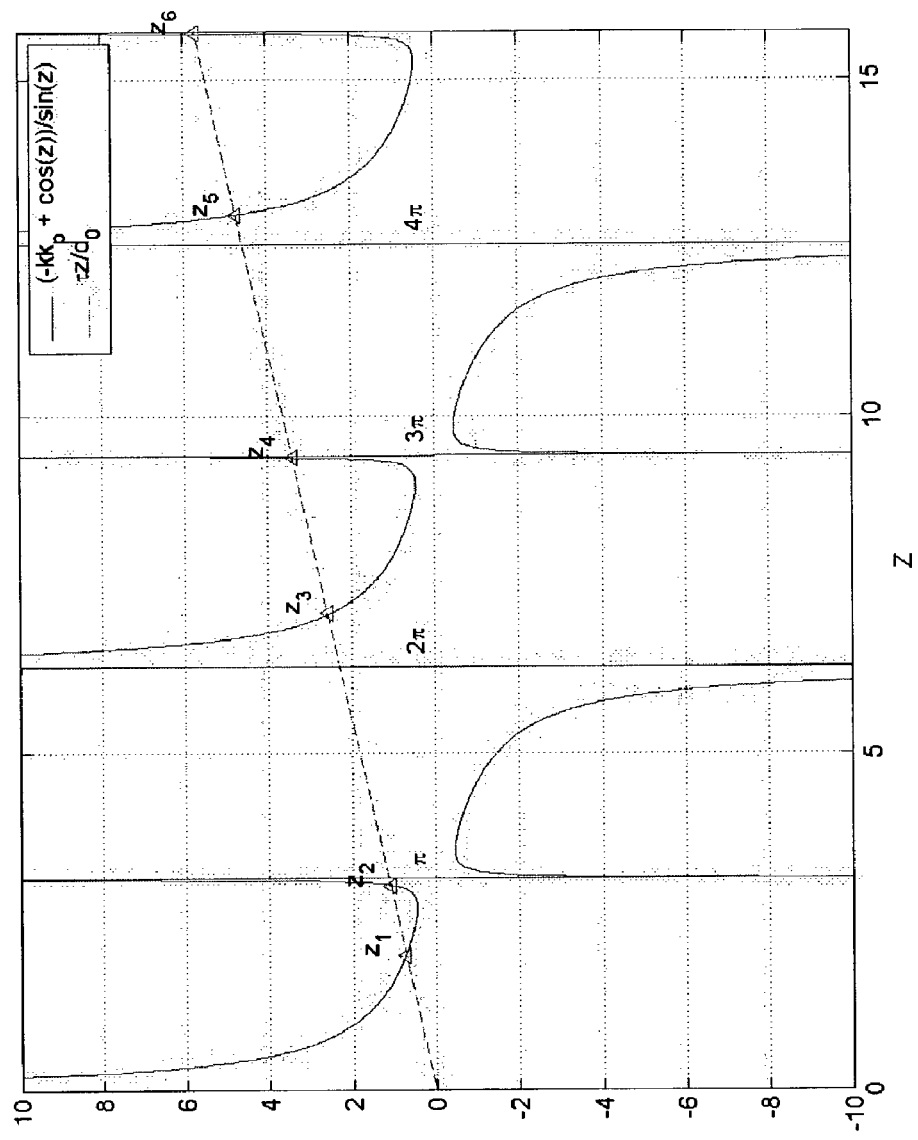
FIG. 7 is a plot of the two terms in Equation (32) for $$k_p < -\frac{1}{k}$$

Here, plot the two terms in (32)

$$\frac{-kk_p + \cos(z)}{\sin(z)} \text{ and } \frac{\tau}{d_0}z$$

for two sub-cases $$k_L < k_p < -\frac{1}{k}$$

and $k_p \leqq k_L$.
FIG. 7 corresponds to the case where $$k_L < k_p < -\frac{1}{k},$$

and $k_L$ is the smallest (negative) number so that the plot of $$\frac{-kk_p + \cos(z)}{\sin(z)}$$

intersects the straight line $$\frac{\tau}{d_0}z$$

twice in the interval $(0,\pi)$.

Figure 8:
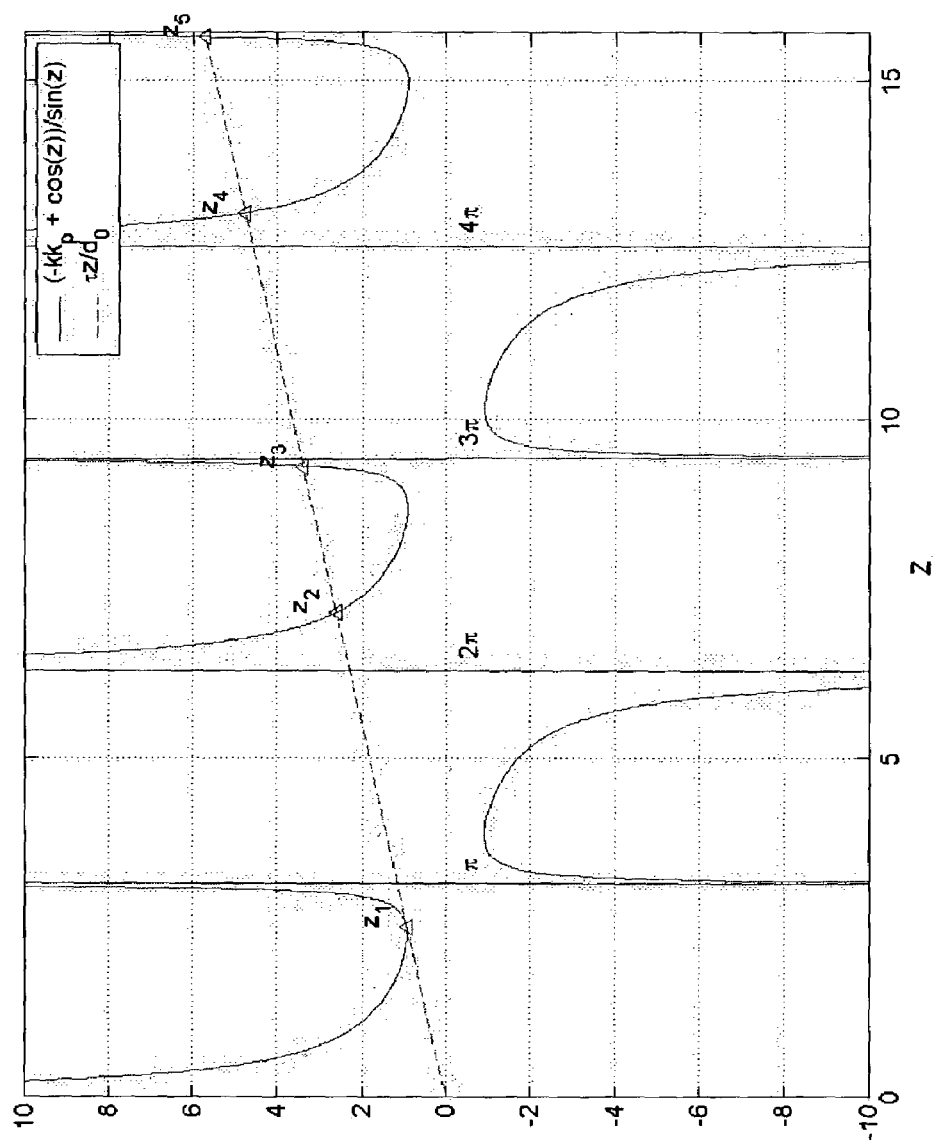
FIG. 8 is a plot of the two terms in Equation (32) for $$k_p < -\frac{1}{k}$$

FIG. 8 corresponds to the case where $k_p \leqq k_L$ and the plot of $$\frac{-kk_p + \cos(z)}{\sin(z)}$$

does not intersect the straight line $$\frac{\tau}{d_0}z$$

twice in the interval $(0,\pi)$.

Now use Theorem 2 to check if $F_i(z)$ has only real roots. Substituting $s_1=d_0s$ in the expression for $F^*(s)$ (in (28)), it can now be seen that the new quasipolynomial in $s_1$ gives us M=2 and L=1.

Choose $$\eta = \frac{\pi}{4}$$

to satisfy the requirement that $F_i(z)$ does not vanish at $\omega=\eta$, i.e., $\sin(\eta)\cdot 0$. Some important observations can be made. From FIGS. 5, 6, and 7, it can be seen that for $$k_L < k_p < \frac{1}{k},$$

$F_i(z)$ has 3 real roots in the interval $$[0, 2\pi - \frac{\pi}{4}] = [0, \frac{7\pi}{4}],$$

including a root at the origin $z_0=0$.

Notice that $F_i(z)$ is an odd function of z. It therefore follows that in the interval $$[-\frac{7\pi}{4}, \frac{7\pi}{4}],$$

$F_i(z)$ will have 5 real roots.

Also observe from FIGS. 5, 6, and 7 that $F_i(z)$ has one real root in the interval $$\left(\frac{7\pi}{4}, \frac{9\pi}{6}\right].$$

Thus, $F_i(z)$ has 4L+M=6 real roots in the interval $$\left[-2\pi + \frac{\pi}{4}, 2\pi + \frac{\pi}{4}\right].$$

Furthermore, we see from FIGS. 5, 6, and 7 that $F_i(z)$ has 2 real roots in each of the intervals $$\left[2l\pi + \frac{\pi}{4}, 2(l+1)\pi + \frac{\pi}{4}\right] \text{ and } \left[-2(l+1)\pi + \frac{\pi}{4}, -2l\pi + \frac{\pi}{4}\right]$$

for l=1, 2, 3, . . . . Hence, it follows that $F_i(z)$ has exactly 4lL+M real roots in the interval $$\left[-2l\pi + \frac{\pi}{4}, 2l\pi + \frac{\pi}{4}\right],$$

for l=1, 2, 3, . . . , which by Theorem 2 implies that $F_i(z)$ has only real roots for $$k_L < k_p < \frac{1}{k}.$$

Note that the cases $$k_p > \frac{1}{k} \text{ and } k_p \leq k_L$$

corresponding to FIG. 4 and FIG. 8 need not be considered further in the discussion since using Theorem 2, it can easily be argued that in these cases, all roots of $F_i(z)$ will not be real, thereby ruling out closed-loop stability.

Now it is possible to determine the minimum bound $k_L$ on the allowable value of $k_p$. From the definition of $k_L$, it follows that if $k_p = k_L$, the plot of $$\frac{-kk_p + \cos(z)}{\sin(z)}$$

intersects the straight line $$\frac{\tau}{d_0}z$$

only once in the interval $(0,\pi)$. Denote as $\alpha_1$ the value of z for which this intersection occurs.

Following this, it is apparent that for $z=\alpha_1 \in (0,\pi)$ $$\frac{-kk_L + \cos(\alpha_1)}{\sin(\alpha_1)} = \frac{\tau}{d_0}\alpha_1 \tag{33}$$

It is also known that for $z=\alpha_1$, the straight line $$\frac{\tau}{d_0}z$$

is tangent to the plot of $$\frac{-kk_L + \cos(z)}{\sin(z)}.$$

Thus $$\frac{d}{dz}\left[\frac{-kk_L + \cos(z)}{\sin(z)}\right]_{z=\alpha_1} = \frac{\tau}{d_0} \quad \frac{kk_L\cos(\alpha_1) - 1}{\sin^2(\alpha_1)} = \frac{\tau}{d_0}$$

which gives $$kk_L\cos(\alpha_1) - 1 = \frac{\tau}{d_0}\sin^2(\alpha_1). \tag{34}$$

By eliminating $kk_L$ between equations (33) and (34) (and using the relationship $\cos^2(\alpha_1) = 1 - \sin^2(\alpha_1)$), it is apparent that $\alpha_1 \in (0,\pi)$ can be obtained as a solution of the equation $$\tan(\alpha_1) = -\frac{\tau}{\tau + d_0}\alpha_1. \tag{35}$$

Once $\alpha_1$ is determined, the parameter $k_L$ can be obtained from (33), i.e., $$k_L = -\frac{1}{k}\left[\frac{\tau}{d_0}a_1\sin(\alpha_1) - \cos(\alpha_1)\right].$$

The real part $F_r(z)$ can now be evaluated at the roots of the imaginary part $F_i(z)$.

For $z_0=0$, it was previously obtained that $F_r(z_0)=-k[k_i+a(0)]=-kk_i$. For $z_j$, j=1, 2, 3, . . . , (29) may be used to obtain the following $$F_r(z_j) = -k[k_i + a(z_j)]. \tag{36}$$

From the previous results, $F_r(z_0) = -kk_i > 0$ or $k_i < 0$. Then interlacing of the roots of $F_r(z)$ and $F_i(z)$ is equivalent to $F_r(z_1) < 0$, $F_r(z_2) > 0$, $F_r(z_3) < 0$, and so on.

Using this fact, the result $F_r(z_0) = -k[k_i + a(0)] > 0$ and Equation (36), the following obtains $$F_r(z_0) > 0 \Rightarrow k_i < 0 \tag{37}$$

$$F_r(z_1) < 0 \Rightarrow k_i > -a(z_1) = a_1$$

-continued
$$F_r(z_2) > 0 \Rightarrow k_i < -a(z_2) = a_2$$
$$F_r(z_3) < 0 \Rightarrow k_i > -a(z_3) = a_3$$
$$F_r(z_4) > 0 \Rightarrow k_i < -a(z_4) = a_4$$
$$\vdots$$

where $$a_j \stackrel{.}{=} a(z_j), j=1, 2, 3, \qquad (38)$$

From the set of inequalities (37), it can clearly be seen that it is required that the odd bounds (i.e., $a_1$, $a_3$, etc.) to be strictly negative in order to obtain a feasible range for the controller parameter $k_i$.

Now it is necessary to examine the behavior of the parameter $a_j$, $j=1, 3, 5, \ldots$, for $k_p$ in the range $$\left(k_L, \frac{1}{k}\right).$$

The following observation will be used in the analysis.

Observation 1: It may be seen from FIGS. 5 to 7 that for $$k_p \in \left(k_L, \frac{1}{k}\right),$$

the odd roots of (32), i.e., $z_j$, $j=1, 3, 5, \ldots$ approach $(j-1)\pi$ as j increases. So in the limit of odd values of j, it obtains that $$\lim_{j \to \infty} \cos(z_j) = 1.$$

Also, since the cosine function monotonically decreases between $(j-1)\pi$ and $j\pi$ for odd values of j, in view of the previous observation, it obtains that $$\cos(z_1) < \cos(z_3) < \cos(z_5) <$$

From (31) and (38)

$$-kd_0 a_j = z_j \sin(z_j) + \frac{\tau}{d_0} z_j^2 \cos(z_j)$$

Using $$z_j \sin(z_j) = \frac{d_0}{\tau}[-kk_p + \cos(z_j)]$$

from (32) it obtains that $$-k\tau a_j = -kk_p + \cos(z_j) + \frac{\tau^2}{d_0^2} z_j^2 \cos(z_j) \qquad (39)$$

-continued
$$-k\tau a_j + kk_p = \left[1 + \frac{\tau^2}{d_0^2} z_j^2\right]\cos(z_j)$$

Recalling that the $z_j$, $j=1, 3, 5, \ldots$, are arranged in increasing order of magnitude, i.e., $z_j < z_{j+2}$. Thus, for odd values of j, it obtains that $$0 < 1 + \frac{\tau^2}{d_0^2} z_j^2 < 1 + \frac{\tau^2}{d_0^2} z_{j+2}^2. \qquad (40)$$

From Observation 1, it is known that $$\cos(z_j) < \cos(z_{j+2})$$

Given (40), the following relationship holds true only if $\cos(z_j) > 0$, $j=1, 3, 5, \ldots$, $$\left[1 + \frac{\tau^2}{d_0^2} z_j^2\right]\cos(z)_j < \left[1 + \frac{\tau^2}{d_0^2} z_{j+2}^2\right]\cos(z_{j+2})$$

Now using (39), it obtains that $$-k\tau a_j + kk_p < k\tau a_{j+2} + kk_p \Rightarrow a_j > a_{j+2} \qquad (41)$$

Thus, for $$k_p \in \left(k_L, \frac{1}{k}\right),$$

the condition (37) reduces to $$\max_{j=1,3,5,\ldots} \{a_j\} < k_i < 0. \qquad (42)$$

Note that the interlacing property and the fact that $F_i(z)$ has only real roots can be used in Theorem 2 to establish that for $$k_p \in \left(k_L, \frac{1}{k}\right),$$

$F_r(z)$ has only real roots. At this point, it can be seen that all the conditions of Theorem 1 are satisfied.

Now the following important observation may be made:

Observation 2: For a fixed value of $$k_p \in \left(k_L, \frac{1}{k}\right),$$

it is possible to find the range of $k_i$ as given in (42) such that the closed-loop TCP/AQM system is stable. However, recalling that $a_j > a_{j+2}$, $j=1, 3, 5, \ldots$, if $\cos(z_j) > 0$. Thus, if $\cos(z_1) > 0$, then the bound $a_1$ is the maximum of all the odd bounds, and the range of stabilizing $k_i$ is given by $a_1 < k_i < 0$. If on the contrary it obtains that $\cos(z_1) < 0$ and $\cos(z_3) > 0$, then the bound $a_3$ is larger than all the other bounds $a_j$, $j=5, 7, 9, \ldots$ but may or may be larger than $a_1$. In this case the range of stabilizing $k_i$ is given by $\max\{a_1,a_3\}<k_i<0$.

Figure 9:
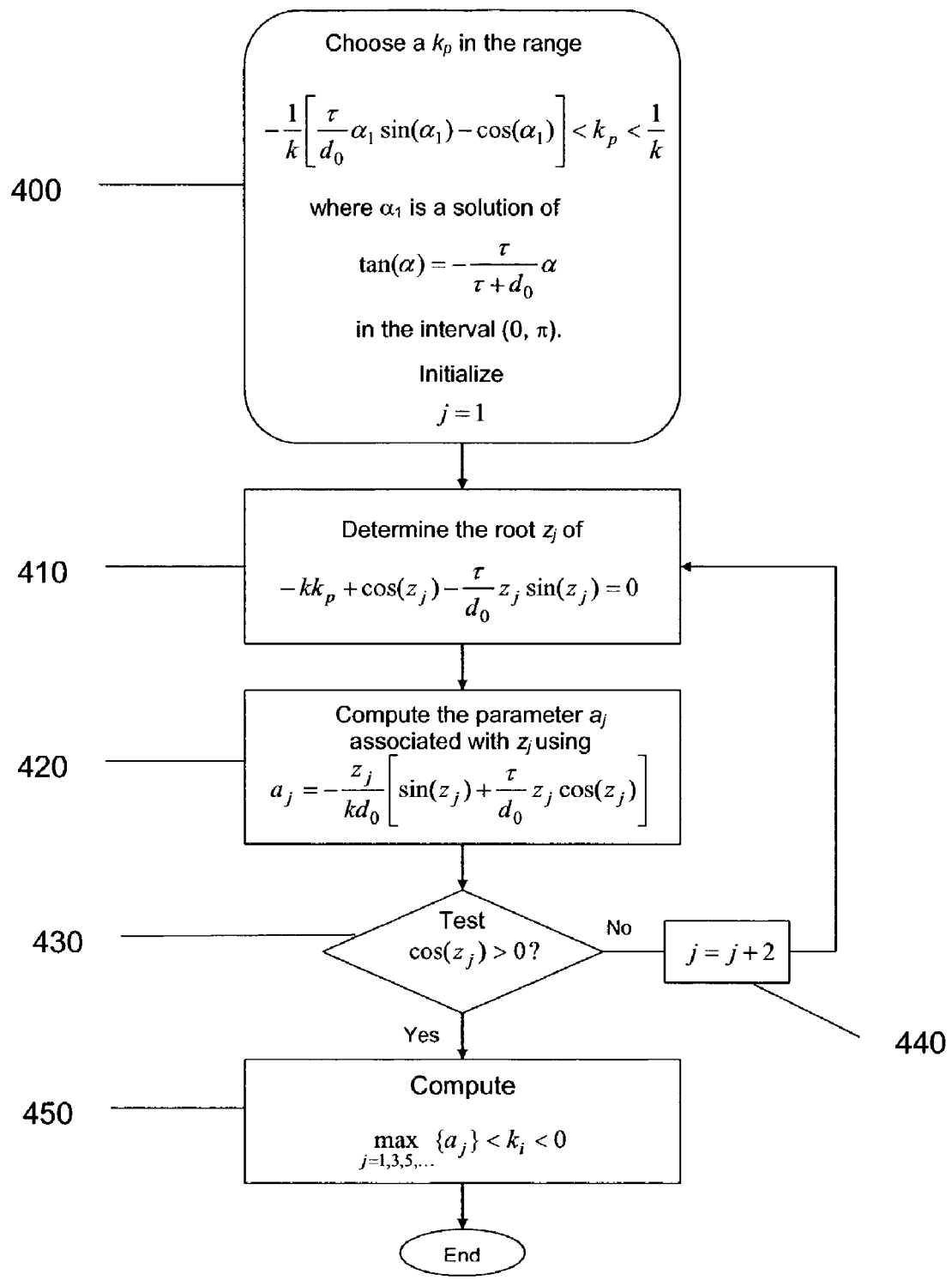
FIG. 9 is a block diagram of a routine for determining the stable P-I gains for a closed-loop TCP/AQM system according to an embodiment of the invention.

Using Observation 2, it is possible to summarize the algorithm for determining the PI controller parameters as shown in FIG. 9. The process initiates, at step 400, by choosing an initial $k_p$ from the range established by equation (26) and for the parameter $k_L$ for which a range of $k_i$ values is desired. A counter j is initialized in order to track odd number roots. In step 410, the $j^{th}$ root $z_j$ is determined using the system parameters and the chosen $k_p$. In step 420 the $a_j$ value associated with the $j^{th}$ root is calculated. In step 430 there is an assessment of whether the $j^{th}$ root $z_j$ results in a positive number. If the $j^{th}$ root $z_j$ does not result in a positive number, the counter is incremented to point to the next odd number root at step 440, and the method is repeated at step 410. Alternatively, if the jth root $z_j$ results in a positive number, then the lower bound for $k_i$ is determined as the maximum of the $a_j$ values determined up to this point at step 450, and the sequence of steps ends.

Figure 10:
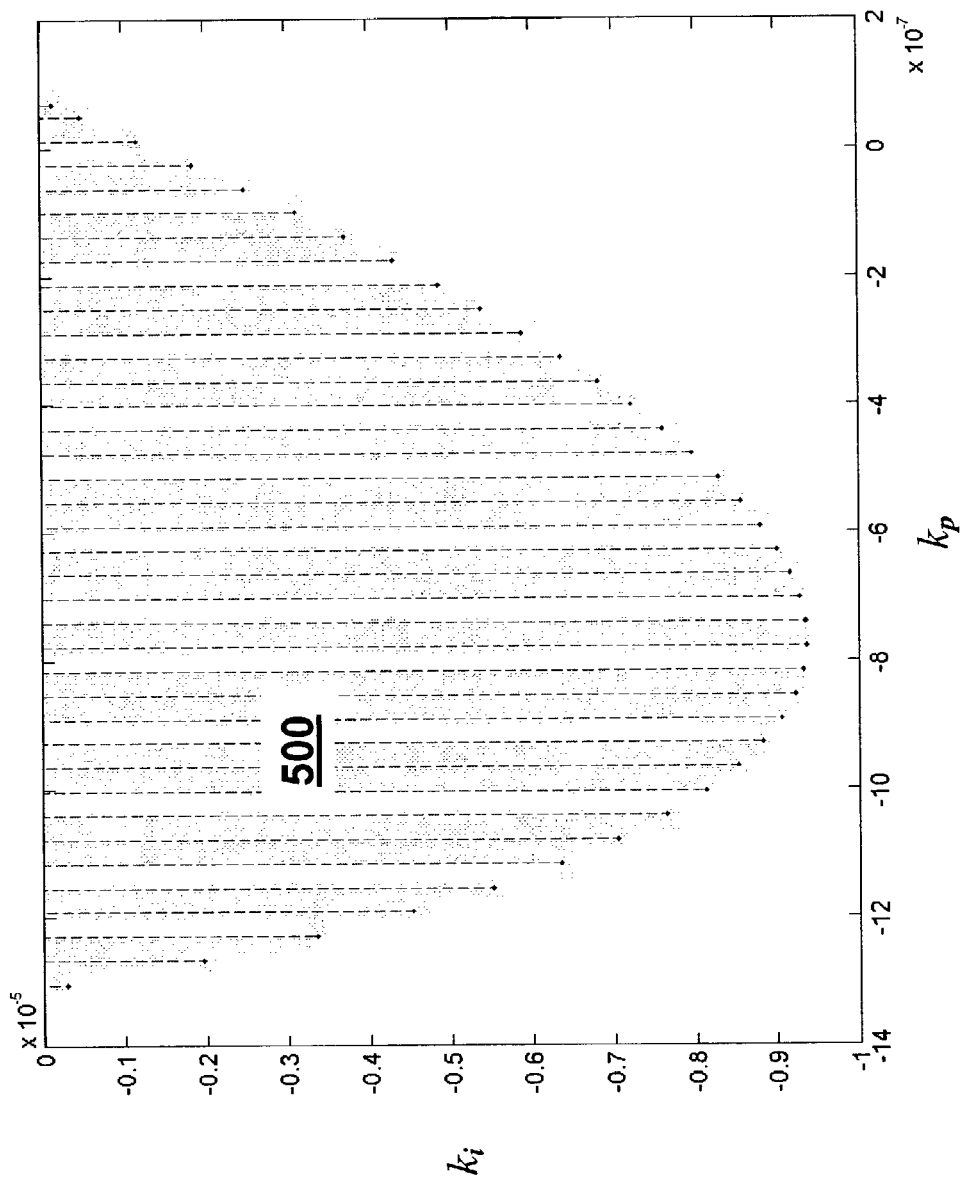
FIG. 10 is a plot of an example stable gain region determined according to an embodiment of the invention.

As an example illustrating the use of the algorithm, consider the sample problem of characterizing the stabilizing PI controller gains for a TCP/AQM system with nominal operating parameters of T=$\rho$C=45 Mbps, N=225, and $d_0$=55 msec. We also select a small nominal packet size of 64 bytes which we use only for the computation of the stability region. A smaller packet size is selected for this purpose because of the fluid-flow model used in the TCP/AQM control problem. Note that in deriving the control parameters, T is the control target and the TCP parameter $\theta$=⅔. Following the procedure described in FIG. 9, compute $\alpha_1 \in (0,\pi)$ satisfying (35) to obtain $\alpha_1$=2.059. From this, it is possible to obtain the range of $k_p$ gains as $-1.3468\times10^{-6}<k_p<6.7705\times10^{-8}$. Sweeping over this range of $k_p$ gains it is possible to find the range of $k_i$ gains. The stabilizing region of the gains in the ($k_p,k_i$) plane for this sample system is shown as region 500 in FIG. 10.

Figure 11:
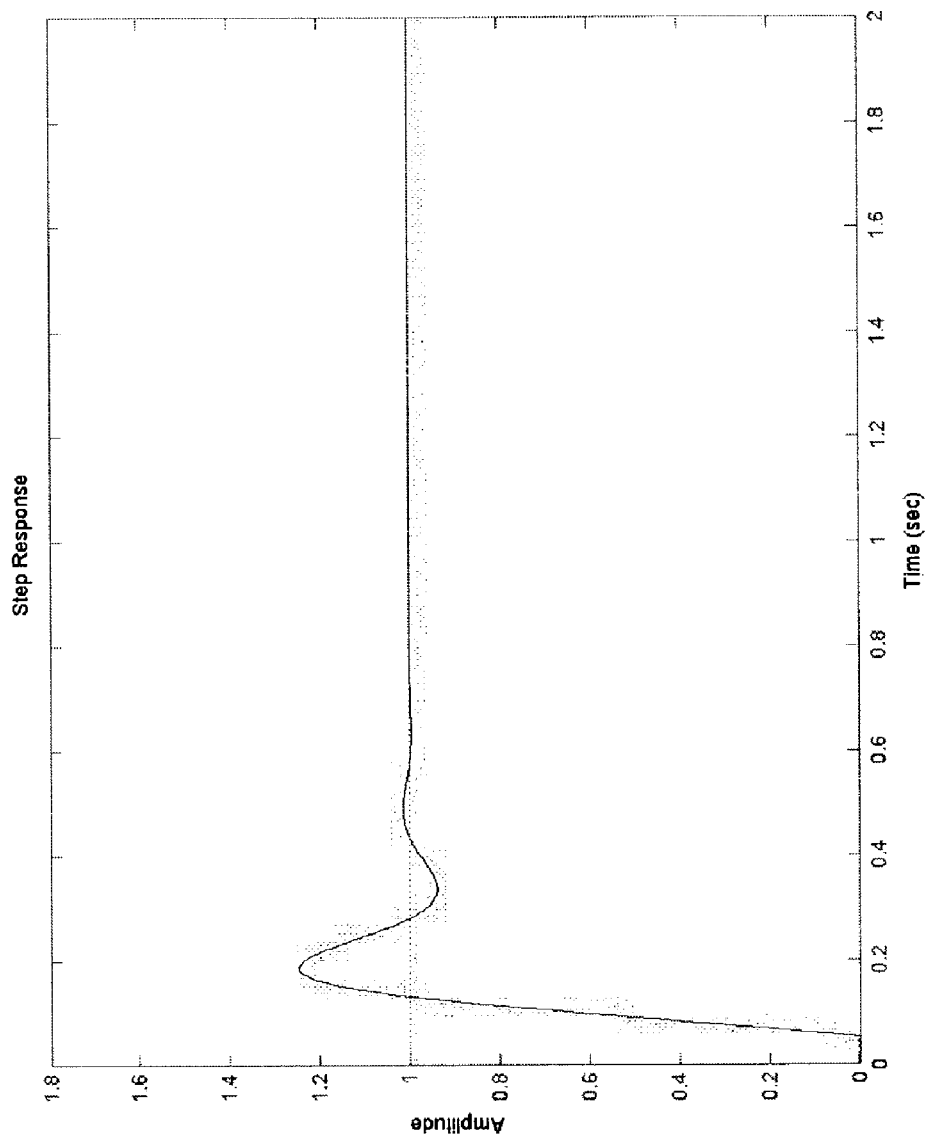
FIG. 11 is a plot of the step response of the example closed-loop TCP/AQM system of FIG. 2.

As a simple assessment of the region of gains obtained, the step response of a pair of gains from within the region may be examined. Set the controller parameters $k_p$ and $k_i$ (to values inside the stabilizing region) as $-6\times10^{-7}$ and $-1\times10^{-6}$, respectively. With these, the step response of the closed-loop TCP/AQM system may be obtained and plotted. The results are shown in FIG. 11. It can be seen from this figure that the closed-loop system is stable and the system output R(t) tracks the step input signal T(t).

Choosing which pair of gains is most appropriate for a given system is a decision of the system engineer. Proportional control reduces error, but high gains may destabilize the system. Integral control improves the steady-state error and provides robustness with respect to parameter variations. Having available a region over which all gain pairs are stable provides the advantage to the system engineer of being able to emphasize whichever aspect of controller performance is most desired, while at the same time ensuring that the system performance remains within bounds.

Once the stabilizing PI controller gains have been determined (based on a TCP/AQM model using small nominal packet size, e.g., 64 byte packets), the PI control algorithm can easily be constructed. The proportional (P) and integral (I) terms in the PI controller output (19) are given, respectively, in the s-domain as $$P_p(s)=C_p(s)\cdot E(s)=k_p\cdot E(s)$$

and $$P_i(s) = C_i(s)\cdot E(s) = \frac{k_1}{s}\cdot E(s),$$

where E(s) is the Laplace transform of the control error e(t)=T−R(t).

Denote $t_m$, m=1, 2, 3, . . . as the sampling instants (i.e., the times the controller reads the input values). The P-term in the controller output can be written in the discrete time domain as $$p_p(t_m)=k_p e(t_m)$$

In the continuous-time domain, the I-term is given as $$p_i(t) = k_i \int_0^t e(h)\,dh.$$

It follows that $$\frac{d p_i(t)}{dt} = k_i e(t).$$

If this derivative is approximated by the backward difference, it is possible to obtain the following discrete-time approximation $$\frac{p_i(t_m) - p_i(t_{m-1})}{\Delta t} = k_i e(t_m),$$

where $\Delta t = t_m - t_{m-1}$, m=1, 2, 3, . . . , is the sampling interval.

This leads to the following recursive equation for the I-term $$p_i(t_m)=p_i(t_{m-1})+k_i \Delta t e(t_m)$$

Figure 12:
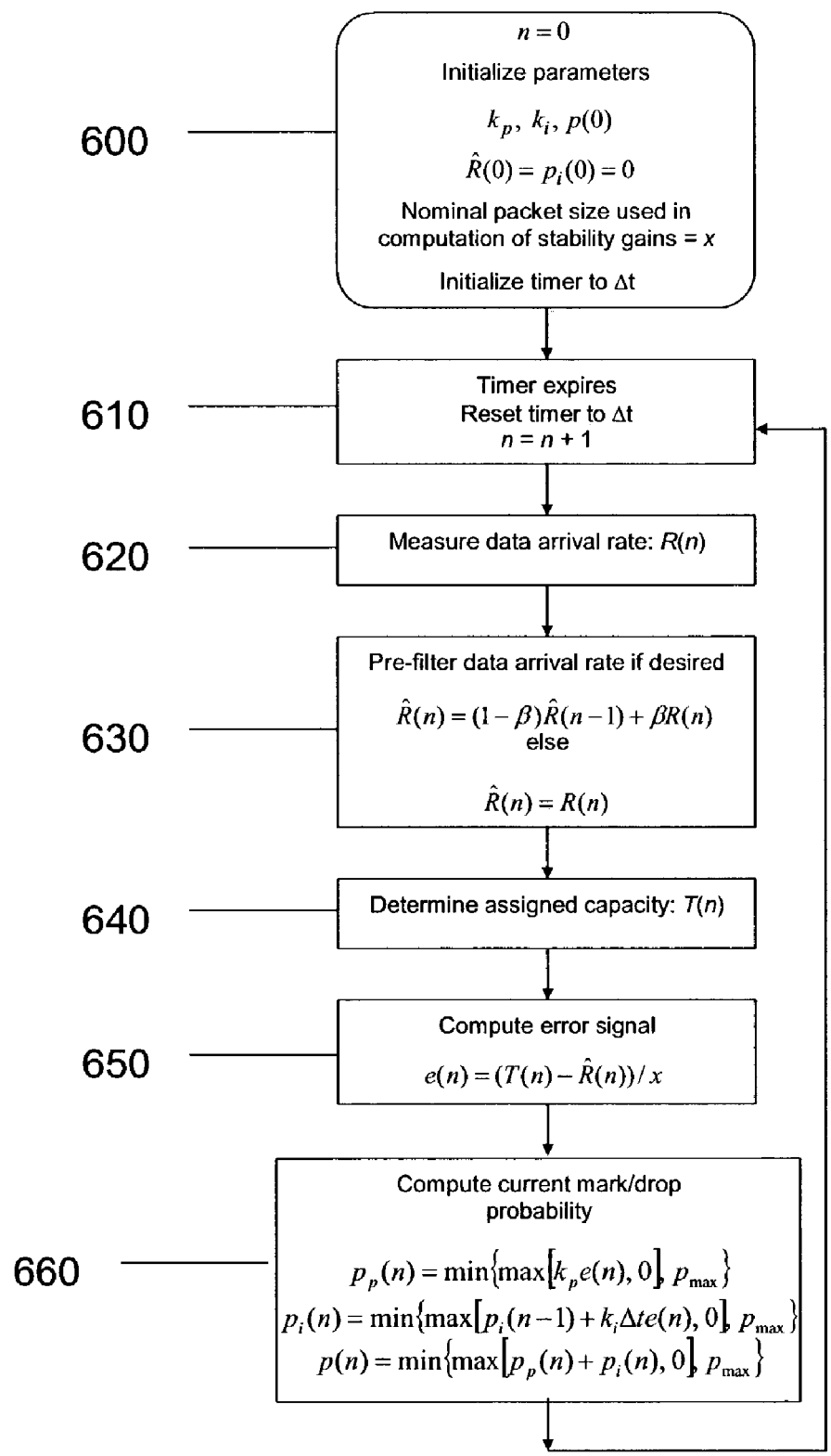
FIG. 12 is a block diagram of a mark/drop probability computation routine according to an embodiment of the invention.
Figure 13:
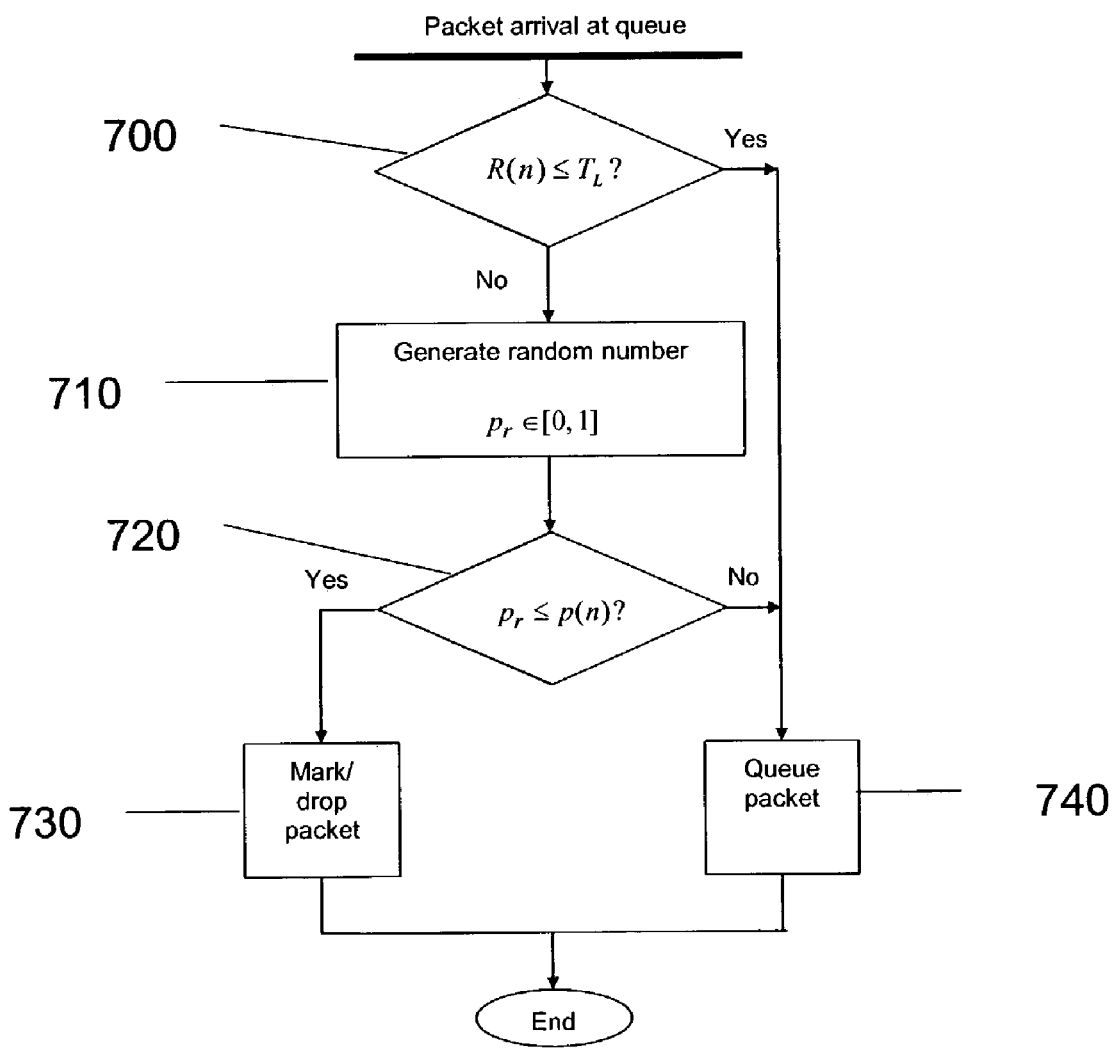
FIG. 13 is a block diagram of a packet drop/mark routine according to an embodiment of the invention.

A flow chart for the control algorithm and the packet mark/drop routine are shown in FIG. 12 and FIG. 13. In the figures, the discrete sampling instants are simply represented as n=0$\Delta$t, 1$\Delta$t, 2$\Delta$t, 3$\Delta$t, . . . . Note that no packet marking/dropping takes place when R(t)≦$T_L$ in FIG. 13. The parameter $T_L$ rate threshold is simply a rate threshold lower than or equal to the control target T during which no packets are marked/dropped even though the mark/drop probability p(t) can be greater than zero. This simple mechanism helps to further minimize oscillations in link utilization and keep the utilization around the control target. Given that the models used in the design of the control system are approximations of the real TCP/AQM plant (i.e., neglect TCP slow start, timeouts), additional mechanisms may be useful to enhance the performance.

It is also important to note that rate measurements are usually noisy and as a result will require some low pass filtering. A simple exponentially weighted moving average (EWMA) filter, for example, can be used for this. The EWMA filter can be expressed as $$\hat{R}(t_m)=(1-\beta)\hat{R}(t_{m-1})+\beta R(t_m),\ 0<\beta<1.$$

As shown in FIG. 12 the process initiates, at step 600, at discrete time n=0, by initializing certain parameters. The timer is set to $\Delta$t time units, and mark/drop probability p(0), Rate signal R(0), and integral probability $p_i(0)$ are set to initial values. The initial mark/drop probability and integral probability are used in the mark/drop routine until further samples are available. At step 610, the timer is reset to $\Delta t$ to advance to the next discrete time interval. Then at step 620 the data arrival rate R is measured.

At step 630 there is an optional step of pre-filtering the data arrival rate as described previously.

At step 640 the assigned capacity is determined. Typically this is a given for a particular network configuration, but may vary as circumstances warrant, for example if the network is modified. At step 650 an error signal e(n) is calculated as the difference between the assigned capacity and the measured (and possibly filtered) data arrival rate. The error signal is normalized by the nominal packet size x so that the measurements R and T will be consistent with the packet size x used in the computations of the stability gains.

At step 660, a current mark/drop probability p(n) is calculated.

The mark/drop probability calculated at step 660 may be used as the mark/drop probability until the next measurement time as tracked by the timer, at which point a new mark/drop probability will be calculated. In addition, the filtered arrival rate R'(n) if filtering is used is stored to be used at the next measurement time.

The process may then loop back to step 610 upon timer expiration for another iteration of the process.

FIG. 13 presents a flowchart of a random number generator mark/drop routine. The decision to accept or mark/drop an incoming packet in the routine is based upon the outcome of a comparison of a randomly generated number $p_r \in [0,1]$ and the mark/drop probability p(n). The procedure can be described as follows.

Upon a packet arrival at the queue, at step 700 a determination is made whether the arrival rate is less than a no-mark/drop rate threshold. If the rate is less than or equal to the rate threshold, then the incoming packet is queued at step 740. If the rate is not less than or equal to the rate threshold, then the routine moves to step 710 where a random number $p_r \in [0,1]$ is generated. At step 720 a determination of whether the random number $p_r$ is less than or equal to the calculated mark/drop probability p(n) is made.

If the probability $p_r$ is less than or equal, then the packet is marked/dropped at step 730. If not, the packet is queued at step 740.

Figure 14:
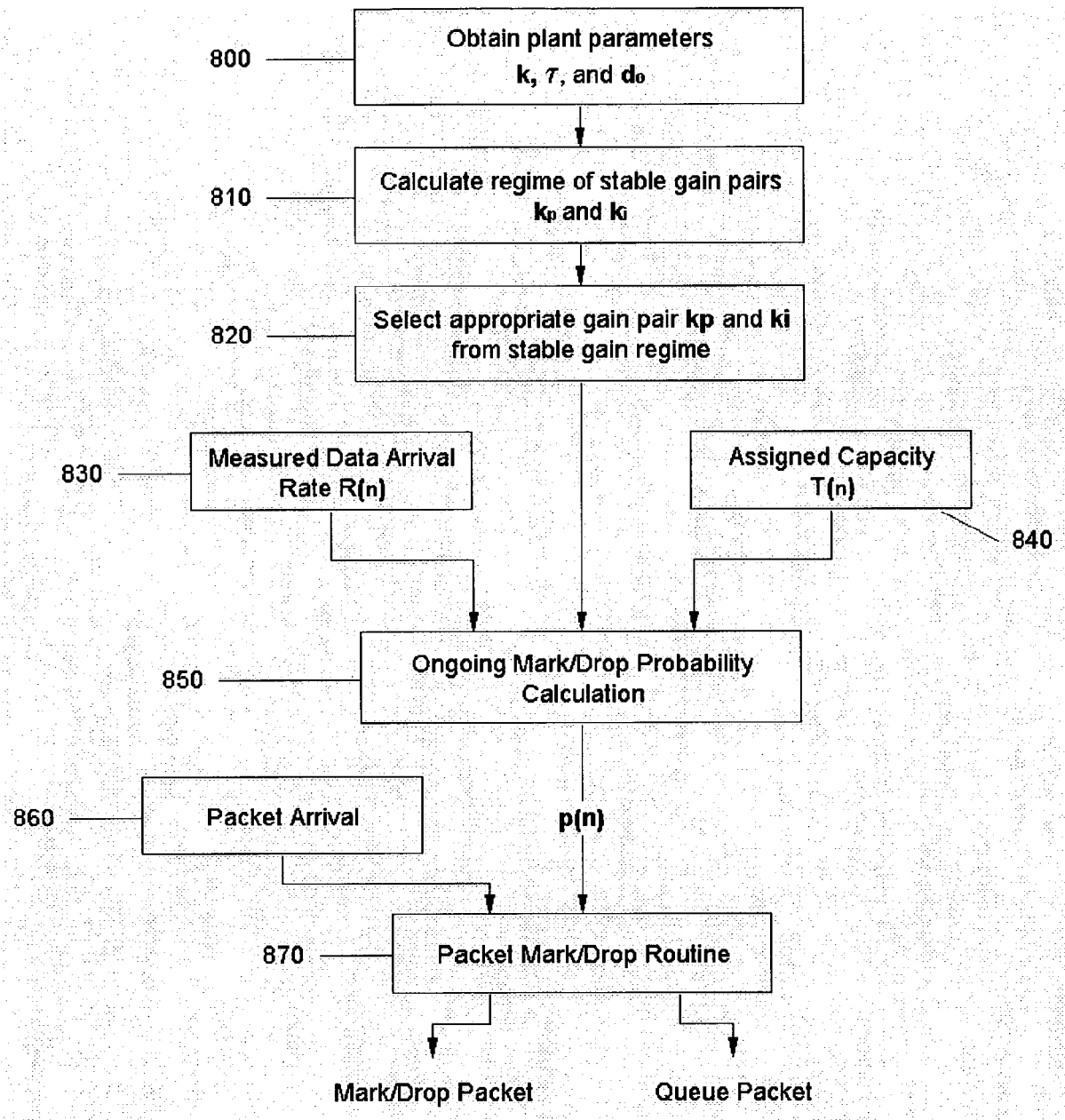
FIG. 14 is a block diagram of an overall control routine according to an embodiment of the invention.

FIG. 14 provides a high-level description of the overall proportional-integral control scheme according to an embodiment of the invention. At module 800 TCP/AQM parameters representative of the specific data network to be controlled are obtained. At module 810 these parameters are used to calculate a regime of stable gain pairs for proportional gain $k_p$ and integral gain $k_i$ for a proportional-integral controller. At module 820 a particular gain pair is selected from the regime calculated in the previous step. At module 850, an ongoing mark/drop probability calculation occurs, using the previously selected gain pairs from module 820, and using a measured data arrival rate from module 830 and an assigned capacity from module 840. A packet arrival recognized by module 860 is directed to a packet mark/drop routine realized in module 870. The module 870 utilizes the current mark/drop probability p(n) calculated by module 850 to make a determination to mark/drop or queue the packet.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for controlling a data flow in a data network, the method comprising:

selecting a stable gain combination of a proportional controller gain $k_p$ and an integral controller gain $k_i$;

measuring a data arrival rate R(n) at time n;

calculating an error signal e(n), according to the relation $$e(n)=(T(n)-R(n))/x,$$

where T(n) is an assigned capacity at time n and x ($x \geq 1$) is a parameter representing a nominal packet size used in the computation of $k_p$ and $k_i$;

computing a mark/drop probability p(n) according to the relation $$p_p(n)=\min\{\max[k_p \cdot e(n),0],p_{max}\}$$

$$p_1(n)=\min\{\max[p_1(n-1)+k_i \cdot \Delta t \cdot e(n),0],p_{max}\}$$

$$p(n)=\min\{\max[p_p(n)+p_i(n),0],p_{max}\}$$

where $\Delta t$ is the time interval between a $(n-1)^{th}$ and the $n^{th}$ computation, and $0 < p_{max} \leq 1$; and executing a packet mark/drop routine, thereby producing at least one marked packed or at least one dropped packet, based upon the calculated mark/drop probability p(n).

2. The method of claim 1 wherein the step of selecting a stable gain combination of a proportional controller gain $k_p$ and an integral controller gain $k_i$ is preceded by the step of:

pre-calculating a range within which all gain pairs $k_i$ and $k_p$ result in a stable gain combination.

3. The method of claim 2 wherein the step of pre-calculating a range within which all gain pairs $k_i$ and $k_p$ result in a stable gain combination for a data network, is determined according to the method of:

(1) obtaining for said network a value for said network a set of parameters k, $d_0$, and $\tau$, where k is a steady-state gain of said network, $d_0$ is a time delay of said network, and $\tau$ is a time constant of said network;

(2) choosing a $k_p$ in the range $$-\frac{1}{k}\left[\frac{\tau}{d_0}\alpha_1 \sin(\alpha_1) - \cos(\alpha_1)\right] < k_p < \frac{1}{k}$$

where $\alpha_1$ is a solution of $$\tan(\alpha) = -\frac{\tau}{\tau+d_0}\alpha$$

in the interval $(0,\pi)$ (3) Initializing a counter j for tracking odd number roots to an initial value of 1;

(4) determining the root $z_j$ of $$-kk_p + \cos(z_j) - \frac{\tau}{d_0}z_j \sin(z_j) = 0;$$

(5) computing the parameter $a_j$ associated with $z_j$ using $$a_j = -\frac{z_j}{kd_0}\left[\sin(z_j) + \frac{\tau}{d_0}z_j\cos(z_j)\right];$$

(6) testing the root $z_j$ to see if a search condition has been reached by determining if $\cos(z_j)>0$;
and if not, incrementing the counter j by 2 and returning to step (4);
(7) if so, choosing the maximum of all calculated $a_j$'s as the lower bound of $k_i$ for the $k_p$ specified in step (2);
(8) repeating steps (2) through (7) for all desired values of $k_p$.

4. The method of claim 1 wherein the step of measuring a data arrival rate R(n) at time n further comprises:
filtering the data arrival rate R(n) according to the relation:

$$R'(n)=(1-\beta)\cdot R'(n-1)+\beta\cdot R(n)$$

where $\beta$ is a filter gain parameter such that $0<\beta<1$, R'(n−1) is the filterrd data arrival rate at time n−1, and R'(n) is the desired filtered data arrival rate at time n.

5. The method of claim 1 further comprising a step, preceding the step of executing a packet mark/drop routine, of:
testing the data arrival rate R(n) against a rate threshold $T_L$; and
if the data arrival rate R(n) is below or equal to the rate threshold $T_L$ then bypassing the step of executing a packet mark/drop routine.

6. The method of claim 1 wherein the step of executing a packet mark/drop routine further comprises:
marking/dropping packets according to a random number generator mark/drop scheme.

7. An apparatus for controlling a data flow in a data network, said apparatus configured according to the method of any of claims 1-6.

8. An apparatus for controlling a data flow in a data network, the apparatus comprising:
a proportional-integral controller having a proportional controller gain $k_p$ setting and an integral controller gain $k_i$ setting;
a specific stable gain setting combination set for said proportional controller gain $k_p$ setting and an integral controller gain $k_i$ setting pair;
a data arrival rate measurer for measuring data arrival rate R(n) at time n;
an error signal calculator for calculating an error signal e(n), according to the relation $$e(n)=(T(n)-R(n))/x,$$

where T(n) is an assigned capacity at time n and $x(x\geq 1)$ is a parameter representing a nominal packet size used in the computation of $k_p$ and $k_i$;
a mark/drop probability processor for computing a mark/drop probability p(n), according to the relation $$p_p(n)=\min\{\max[k_p\cdot e(n),0],p_{max}\}$$

$$p_i(n)=\min\{\max[p_i(n-1)+k_i\cdot\Delta t\cdot e(n),0],p_{max}\}$$

$$p(n)=\min\{\max[p_p(n)+p_i(n),0],p_{max}\}$$

where $\Delta t$ is the time interval between a $(n-1)^{th}$ and the $n^{th}$ computation, and $0<p_{max}\leq 1$; and
a packet mark/drop module for executing a packet mark/drop routine, thereby producing at least one marked packed or at least one dropped packet, based upon the calculated mark/drop probability p(n).

9. The apparatus of claim 8 wherein the stable gain combination of a proportional controller gain $k_p$ setting and an integral controller gain $k_i$ setting is chosen from a pre-calculated range within which all gain pairs $k_i$ and $k_p$ result in a stable gain combination.

10. The apparatus of claim 9 wherein the pre-calculated range within which all gain pairs $k_i$ and $k_p$ result in a stable gain combination for said data network, is determined according to the method of:
(1) obtaining for said network a value for said network a set of parameters k, $d_0$, and $\tau$,
where k is a steady-state gain of said network,
$d_0$ is a time delay of said network, and
$\tau$ is a time constant of said network;
(2) choosing a $k_p$ in the range $$-\frac{1}{k}\left[\frac{\tau}{d_0}\alpha_1\sin(\alpha_1)-\cos(\alpha_1)\right]<k_p<\frac{1}{k}$$

where $\alpha_1$ is a solution of $$\tan(\alpha)=-\frac{\tau}{\tau+d_0}\tau$$

in the interval $(0,\pi)$
(3) initializing a counter j for tracking odd number roots to an initial value of
(4) determining the root $z_j$ of $$-kk_p+\cos(z_j)-\frac{\tau}{d_0}z_j\sin(z_j)=0;$$

(5) computing the parameter $a_j$ associated with $z_j$ using $$a_j = -\frac{z_j}{kd_0}\left[\sin(z_j) + \frac{\tau}{d_0}z_j\cos(z_j)\right];$$

(6) testing the root $z_j$ to see if a search condition has been reached by determining if $\cos(z_j)>0$;
and if not, incrementing the counter j by 2 and returning to step (4);
and if so, choosing the maximum of all calculated $a_j$'s as the lower bound of $k_i$ for the $k_p$ specified in step (2);
(7) repeating steps (2) through (6) for all desired values of $k_p$.

11. The apparatus of claim 8 wherein the data arrival rate measurer for measuring data arrival rate R(n) at time n further comprises:
a filter for filtering the data arrival rate R(n) according to the relation:

$$R'(n)=(1-\beta)\cdot R'(n-1)+\beta\cdot R(n)$$

where $\beta$ is a filter gain parameter such that $0<\beta<1$, R'(n−1) is the filtered data arrival rate at time n−1, and R'(n) is the desired filtered data arrival rate at time n.

12. The apparatus of claim 8 further comprising:
a test module for testing the data arrival rate R(n) against a rate threshold $T_L$; and
if the data arrival rate R(n) is below or equal to the rate threshold $T_L$ then bypassing the packet mark/drop module.

13. The apparatus of claim 8 wherein the packet mark/drop module further comprises:
a random number generator drop scheme module.

14. A computer program product, comprising a computer readable medium having stored thereon computer executable instructions, which, when executed by at least one processor, cause the at least one processor to control a data flow by performing the steps of:

selecting a stable gain combination of a proportional controller gain $k_p$ and an integral controller gain $k_i$;
measuring a data arrival rate $R(n)$ at time n;
calculating an error signal $e(n)$, according to the relation $e(n)=(T(n)-R(n))/x$, where $T(n)$ is an assigned capacity at time n and x ($x \geq 1$) is a parameter representing a nominal packet size used in the computation of $k_p$ and $k_i$;

computing a mark/drop probability $p(n)$ according to the relation $p_p(n)=\min\{\max[k_p \cdot e(n),0],p_{max}\}$ $p_i(n)=\min\{\max[p_i(n-1)+k_i \cdot \Delta t \cdot e(n),0],p_{max}\}$ $p(n)=\min\{\max[p_p(n)+p_i(n),0],p_{max}\}$ where $\Delta t$ is the time interval between a $(n-1)^{th}$ and the $n^{th}$ computation, and $0 < p_{max} < 1$; and executing a packet mark/drop routine, thereby producing at least one marked packed or at least one dropped packet, based upon the calculated mark/drop probability $p(n)$.

* * * * *